United States Patent
Gao et al.

(10) Patent No.: US 9,807,605 B2
(45) Date of Patent: Oct. 31, 2017

(54) METHOD AND DEVICE FOR SWITCHING SUBSCRIPTION MANAGER-SECURE ROUTING DEVICE

(71) Applicant: Huawei Device Co., Ltd., Shenzhen (CN)

(72) Inventors: Linyi Gao, Beijing (CN); Hui Jin, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 170 days.

(21) Appl. No.: 14/586,664

(22) Filed: Dec. 30, 2014

(65) Prior Publication Data
US 2015/0121495 A1    Apr. 30, 2015

Related U.S. Application Data

(63) Continuation of application No. PCT/CN2013/085222, filed on Oct. 15, 2013.

(30) Foreign Application Priority Data

Oct. 15, 2012   (CN) .......................... 2012 1 0390400

(51) Int. Cl.
| | |
|---|---|
| *H04W 12/02* | (2009.01) |
| *H04W 12/04* | (2009.01) |
| *H04L 29/06* | (2006.01) |

(52) U.S. Cl.
CPC ......... *H04W 12/02* (2013.01); *H04L 63/0428* (2013.01); *H04W 12/04* (2013.01)

(58) Field of Classification Search
CPC ..... H04W 12/04; H04W 12/06; H04W 12/08; H04W 4/001; H04W 4/005; H04W 8/22; H04L 63/0823; G06F 21/62

(Continued)

(56) References Cited

U.S. PATENT DOCUMENTS

2014/0011541 A1* 1/2014 Cormier ................ H04W 8/183
                                                                     455/558
2015/0011202 A1  1/2015 Guo et al.

FOREIGN PATENT DOCUMENTS

| CN | 102630081 A | 8/2012 |
| WO | 2012085593 A1 | 6/2012 |

OTHER PUBLICATIONS

Zhimin, D., "Embedded UICC and its Remote Management Technology," Qualcomm Wireless Comm. Technology (China) Limited, Beijing 100080, China, 2011, 4 pages. (Abstract Only).

(Continued)

*Primary Examiner* — Brian Shaw
(74) *Attorney, Agent, or Firm* — Slater Matsil, LLP

(57) ABSTRACT

The present invention provides a method and a device for switching a subscription manager-secure routing device. The method includes: acquiring, by a second SM-SR from a first SM-SR, a PIC corresponding to an eUICC; acquiring, by the second SM-SR from a second SM-DP, a second PP that is encrypted by using the PIC; generating, by the second SM-SR, a key pair including a public key and a private key; sending, by the second SM-SR, the second PP and the public key to the eUICC through the first SM-SR, so that the eUICC accesses the second SM-SR after deactivating a first PP and activating the second PP; and encrypting, by the second SM-SR, a second PMC by using the private key, and sending an encrypted second PMC to the eUICC, so that the eUICC accesses the mobile network through the second SM-SR.

34 Claims, 20 Drawing Sheets

(58) Field of Classification Search
USPC .............. 455/411; 380/247; 713/189; 726/27
See application file for complete search history.

(56) References Cited

OTHER PUBLICATIONS

"CSMA Embedded SIM Task Force Requirements and Use Cases," GSM Association, Non-Confidential White Paper, Feb. 21, 2011, 38 pages.
"Reprogranimable SIMs: Technology, Evolution and Implications, Final Report," CSMG a TMNG Global Company, Sep. 25, 2012, 95 pages.
"<Smart Cards; Embedded UICC; Requirements Specification>," European Telecommunications Standards Institute, Draft ETSI TS 103 383 V<0.0.6>, May 2011, 20 pages.

* cited by examiner

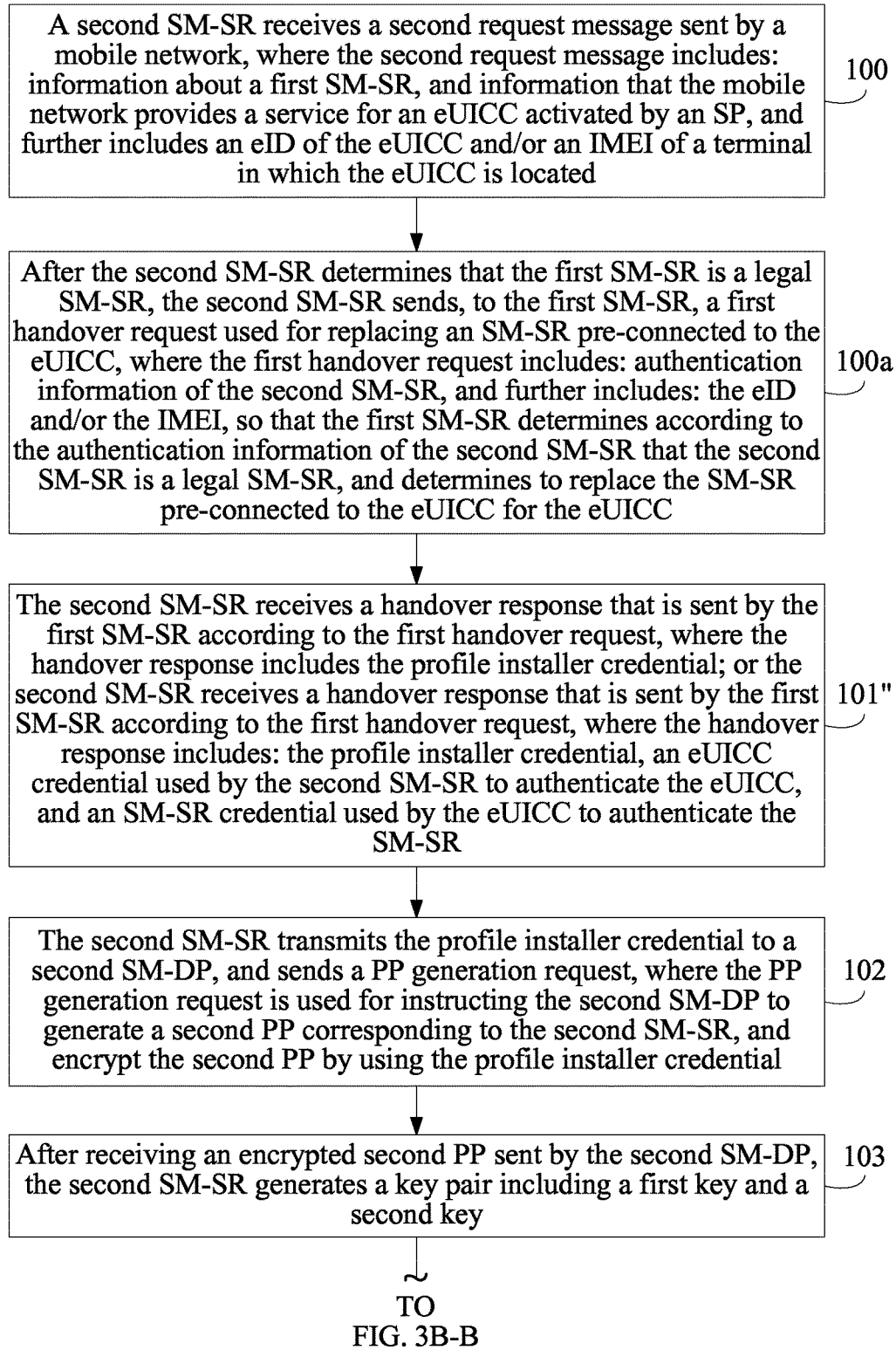
FIG. 3B-A

CONT.
FROM
FIG. 3B-A

| The second SM-SR sends a third request message to the first SM-SR, where the third request message includes: the encrypted second PP and the first key, and the third request message is used for instructing the first SM-SR to send the encrypted second PP and the first key to the eUICC, so that the eUICC replaces an internally preset first SM-SR according to an SM-SR replacement message sent by the first SM-SR | 104 |

| The second SM-SR receives an access request message sent by the eUICC, where the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP | 105 |

| The second SM-SR encrypts, by using the second key, a second profile management credential corresponding to the second SM-SR, and sends the encrypted second profile management credential to the eUICC, so that the eUICC interacts with the second SM-SR after receiving the second profile management credential, so as to obtain an OP profile used for accessing the mobile network, and access the mobile network according to the OP profile | 106 |

FIG. 3B-B

```
┌─────────────────────────────────────────────────────────┐
│ A second SM-SR receives a second request message sent by a │
│   mobile network, where the second request message includes: │
│ information about a first SM-SR, and information that the mobile │ 100
│ network provides a service for an eUICC activated by an SP, and │
│     further includes an eID of the eUICC and/or an IMEI of a     │
│            terminal in which the eUICC is located                │
└─────────────────────────────────────────────────────────┘
                              │
                              ▼
┌─────────────────────────────────────────────────────────┐
│ After the second SM-SR determines that the first SM-SR is a │
│  legal SM-SR, the second SM-SR sends, to the first SM-SR, a │
│       first handover request used for replacing an SM-SR pre- │
│    connected to the eUICC, where the first handover request  │
│ includes: authentication information of the second SM-SR, and │ 100a
│   further includes: the eID and/or the IMEI, so that the first SM- │
│ SR determines according to the authentication information of the │
│   second SM-SR that the second SM-SR is a legal SM-SR, and      │
│   determines to replace the SM-SR pre-connected to the eUICC    │
│                         for the eUICC                            │
└─────────────────────────────────────────────────────────┘
                              │
                              ▼
┌─────────────────────────────────────────────────────────┐
│ The second SM-SR receives a handover response that is sent by │
│   the first SM-SR according to the first handover request, where │
│ the handover response includes the profile installer credential; or │
│   the second SM-SR receives a handover response that is sent by │ 101"
│    the first SM-SR according to the first handover request, where │
│     the handover response includes: the profile installer credential, │
│   an eUICC credential used by the second SM-SR to authenticate │
│      the eUICC, and an SM-SR credential used by the eUICC to    │
│                    authenticate the SM-SR                        │
└─────────────────────────────────────────────────────────┘
                              │
                              ▼
┌─────────────────────────────────────────────────────────┐
│ The second SM-SR transmits the profile installer credential to a │
│  second SM-DP, and sends a PP generation request, where the PP │ 102
│   generation request is used for instructing the second SM-DP to │
│   generate a second PP corresponding to the second SM-SR, and │
│     encrypt the second PP by using the profile installer credential │
└─────────────────────────────────────────────────────────┘
                              │
                              ▼
┌─────────────────────────────────────────────────────────┐
│ After receiving an encrypted second PP sent by the second SM- │ 103
│ DP, the second SM-SR generates a key pair including a first key │
│                       and a second key                            │
└─────────────────────────────────────────────────────────┘
                              │
                              ▼
                             TO
                          FIG. 3C-B
```

FIG. 3C-A

CONT.
FROM
FIG. 3C-A

The second SM-SR sends a third request message to the first SM-SR, where the third request message includes: the encrypted second PP and the first key, and the third request message is used for instructing the first SM-SR to send the encrypted second PP and the first key to the eUICC, so that the eUICC replaces an internally preset first SM-SR according to an SM-SR replacement message sent by the first SM-SR — 104

The second SM-SR determines according to the eUICC credential that the eUICC is a legal device — 105a The second SM-SR receives an access request message sent by the eUICC, where the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP — 105

The second SM-SR encrypts, by using the second key, a second profile management credential corresponding to the second SM-SR, and sends the encrypted second profile management credential and the SM-SR credential to the eUICC, so that the eUICC interacts with the second SM-SR after determining according to the SM-SR credential that the second SM-SR is a legal SM-SR, so as to obtain the OP profile used for accessing the mobile network, and access the mobile network according to the OP profile — 106'

FIG. 3C-B

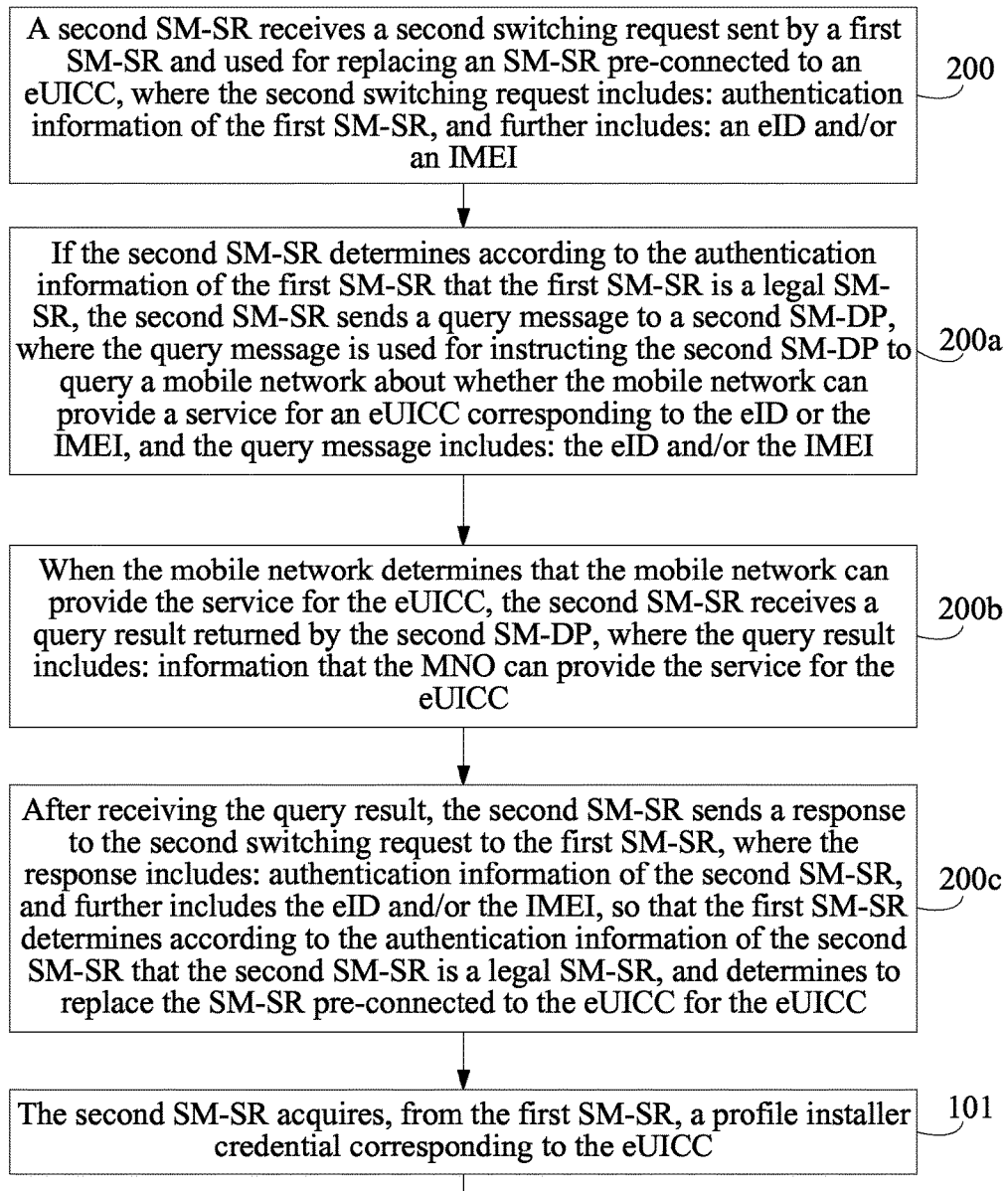
FIG. 4A-A

CONT.
FROM
FIG. 4A-A

The second SM-SR transmits the profile installer credential to the second SM-DP, and sends a PP generation request, where the PP generation request is used for instructing the second SM-DP to generate a second PP corresponding to the second SM-SR, and encrypt the second PP by using the profile installer credential — 102

After receiving an encrypted second PP sent by the second SM-DP, the second SM-SR generates a key pair including a first key and a second key — 103

The second SM-SR sends a third request message to the first SM-SR, where the third request message includes: the encrypted second PP and the first key, and the third request message is used for instructing the first SM-SR to send the encrypted second PP and the first key to the eUICC, so that the eUICC replaces an internally preset first SM-SR according to an SM-SR replacement message sent by the first SM-SR — 104

The second SM-SR receives an access request message sent by the eUICC, where the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP — 105

The second SM-SR encrypts, by using the second key, a second profile management credential corresponding to the second SM-SR, and sends the encrypted second profile management credential to the eUICC, so that the eUICC interacts with the second SM-SR after receiving the second profile management credential, so as to obtain an OP profile used for accessing the mobile network, and access the mobile network according to the OP profile — 106

FIG. 4A-B

| A second SM-SR receives a third switching request that is sent by an SP after the SP activates an eUICC and used for replacing an SM-SR pre-connected to the eUICC, where the third switching request includes: information about the first SM-SR, and further includes: an eID and/or an IMEI | 300 |

↓

| After determining that the first SM-SR is a legal SM-SR, the second SM-SR sends a query message to the second SM-DP, where the query message is used for instructing the second SM-DP to query a mobile network about whether the MNO can provide a service for an eUICC corresponding to the eID or the IMEI, and the query message includes: the eID and/or the IMEI | 300a |

↓

| When the mobile network determines that the mobile network can provide the service for the eUICC, the second SM-SR receives a query result returned by the second SM-DP, where the query result includes: information that the MNO can provide the service for the eUICC | 300b |

↓

| After receiving the query result, the second SM-SR sends, to the first SM-SR, a first switching request used for replacing the SM-SR pre-connected to the eUICC, where the first switching request includes: authentication information of the second SM-SR, and further includes: the eID and/or the IMEI, so that the first SM-SR determines according to the authentication information of the second SM-SR that the second SM-SR is a legal SM-SR, and determines to replace the SM-SR pre-connected to the eUICC for the eUICC | 300c |

↓

| The second SM-SR acquires, from the first SM-SR, a profile installer credential corresponding to the eUICC | 101 |

CONT.
FROM
FIG. 4B-A

The second SM-SR transmits the profile installer credential to the second SM-DP, and sends a PP generation request, where the PP generation request is used for instructing the second SM-DP to generate a second PP corresponding to the second SM-SR, and encrypt the second PP by using the profile installer credential — 102

After receiving an encrypted second PP sent by the second SM-DP, the second SM-SR generates a key pair including a first key and a second key — 103

The second SM-SR sends a third request message to the first SM-SR, where the third request message includes: the encrypted second PP and the first key, and the third request message is used for instructing the first SM-SR to send the encrypted second PP and the first key to the eUICC, so that the eUICC replaces an internally preset first SM-SR according to an SM-SR replacement message sent by the first SM-SR — 104

The second SM-SR receives an access request message sent by the eUICC, where the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP — 105

The second SM-SR encrypts, by using the second key, a second profile management credential corresponding to the second SM-SR, and sends the encrypted second profile management credential to the eUICC, so that the eUICC interacts with the second SM-SR after receiving the second profile management credential, so as to obtain an OP profile used for accessing the mobile network, and access the mobile network according to the OP profile — 106

FIG. 4B-B

METHOD AND DEVICE FOR SWITCHING SUBSCRIPTION MANAGER-SECURE ROUTING DEVICE

This application claims the benefit of International Application No. PCT/CN2013/085222, filed on Oct. 15, 2013, which claims priority to Chinese Patent Application No. 201210390400.9, filed on Oct. 15, 2012, and which applications are hereby incorporated by reference.

TECHNICAL FIELD

Embodiments of the present invention relate to the field of communications, and in particular, to a method and a device for switching a subscription manager-secure routing device.

BACKGROUND

A conventional universal integrated circuit card (Universal Integrated Circuit Card, UICC for short) is customized by an operator, and includes related information about the operator at delivery, and after delivery, the information about the operator cannot be changed.

An embedded UICC (embedded UICC, eUICC for short) is a UICC embedded into a terminal, and it can be implemented that an operator and a corresponding subscription manager-secure routing unit (Subscription Manager-Secure Routing, SM-SR for short) perform remote management on the eUICC, for example, downloading data of the operator, handing over to or accessing a mobile network of the operator, and the like.

Generally, at delivery, a provisioning profile (Provisioning Profile, PP for short) used for accessing an SM-SR is installed in the eUICC, for connecting to a preset SM-SR (for example, connecting to an SM-SR A), where the SM-SR A is used for implementing an operation, such as downloading, on operational profiles (Operational Profile, OP for short), and these OPs are profiles that is required by the eUICC to access a mobile network.

In an actual application, a profile installer credential (Profile Installer Credential, PIC for short) corresponding to the preset SM-SR is further set in the eUICC, so as to implement that the SM-SR can download a series of profiles (such as the OPs) and/or data located in the eUICC.

In the prior art, after the eUICC is delivered, a mobile network of an operator provides a service for the eUICC; however, an SM-SR used by a mobile network of the operator is an SM-SR B, that is, a second SM-SR; in this case, a source SM-SR A, that is, a first SM-SR, needs to transfer a remote management right on the eUICC to the SM-SR B.

However, in the foregoing SM-SR switching process, how to ensure that a profile management credential (Profile Management Credential, PMC for short) in the target SM-SR B and used for ensuring that the eUICC can establish secure communication with an external entity (such as an SM) cannot be learned by the source SM-SR A has become a technical problem to be solved currently.

SUMMARY

In view of this, embodiments of the present invention provide a method and a device for switching a subscription manager-secure routing device, which are used to ensure a problem that a profile management credential of a target SM-SR B cannot be learned by a source SM-SR A in a SM-SR switching process of an eUICC.

According to a first aspect, an embodiment of the present invention provides a method for switching a subscription manager-secure routing device, including:

acquiring, by a second SM-SR from a first SM-SR, a profile installer credential corresponding to an eUICC;

transmitting, by the second SM-SR, the profile installer credential to a second SM-DP, and sending a PP generation request, where the PP generation request is used for instructing the second SM-DP to generate a second PP corresponding to the second SM-SR and encrypt the second PP by using the profile installer credential;

after receiving an encrypted second PP sent by the second SM-DP, generating, by the second SM-SR, a key pair including a first key and a second key;

sending, by the second SM-SR, a third request message to the first SM-SR, where the third request message includes: the encrypted second PP and the first key, and the third request message is used for instructing the first SM-SR to send the encrypted second PP and the first key to the eUICC, so that the eUICC replaces an internally preset first SM-SR according to an SM-SR replacement message sent by the first SM-SR;

receiving, by the second SM-SR, an access request message sent by the eUICC, where the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP; and encrypting, by the second SM-SR by using the second key, a second profile management credential corresponding to the second SM-SR, and sending an encrypted second profile management credential to the eUICC, so that the eUICC interacts with the second SM-SR after receiving the second profile management credential, so as to obtain an OP profile used for accessing a mobile network, and access the mobile network according to the OP profile.

According to a second aspect, an embodiment of the present invention provides a method for switching a subscription manager-secure routing device, including:

receiving, by an eUICC, an SM-SR replacement message sent by a first SM-SR, where the SM-SR replacement message includes: an encrypted second PP, a first key, and replacement indication information, where the first key is a key in a key pair generated by a second SM-SR; and the encrypted second PP is a second PP that is acquired by the second SM-SR from a second SM-DP, encrypted by the second SM-DP by using a profile installer credential, and used for accessing the second SM-SR;

decrypting, by the eUICC, the encrypted second PP by using an internally preset credential, deactivating or deleting a preset first PP corresponding to the first SM-SR, deleting a first profile management credential corresponding to the first SM-SR, and activating the second PP, and sending an access request message to the second SM-SR, where the access request message is used for enabling the second SM-SR to send a second profile management credential corresponding to the second SM-SR;

receiving, by the eUICC, the second profile management credential that is encrypted by the second SM-SR by using a second key in the key pair, decrypting the encrypted second profile management credential by using the first key, and interacting with the second SM-SR, so as to obtain an OP profile used for accessing a mobile network; and accessing, by the eUICC, the mobile network according to the OP profile.

According to a third aspect, an embodiment of the present invention provides a method for switching a subscription manager-secure routing device, including:

after receiving trigger information used for replacing an SM-SR pre-connected to an eUICC, sending, by a first SM-SR to a second SM-SR, a profile installer credential used for encrypting a profile, where the trigger information includes information about the second SM-SR;

receiving, by the first SM-SR, an encrypted second PP and a first key in a key pair that are sent by the second SM-SR, where the encrypted second PP is a second PP that is acquired by the second SM-SR from a second SM-DP, encrypted by the second SM-DP by using the profile installer credential, and used for accessing the second SM-SR, and the key pair is keys generated by the second SM-SR and used for ensuring interaction security between the eUICC and the second SM-SR; and sending, by the first SM-SR, an SM-SR replacement message to the eUICC, where the SM-SR replacement message includes: the encrypted second PP, the first key in the key pair, and replacement indication information, so that the eUICC accesses the second SM-SR according to the SM-SR replacement message.

According to a fourth aspect, an embodiment of the present invention provides a method for switching a subscription manager-secure routing device, where a mobile network is a mobile network corresponding to a second SM-SR, including:

receiving, by the mobile network, a first request message that is sent by an SP after the SP activates an eUICC, where the first request message includes: information about the first SM-SR, and an eID of the eUICC and/or an IMEI of a terminal in which the eUICC is located; and sending, by the mobile network, a second request message to the second SM-SR, where the second request message includes: the information about the first SM-SR, and information that the mobile network provides a service for the eUICC activated by the SP, and further includes the eID of the eUICC and/or the IMEI of the terminal in which the eUICC is located, so that the eUICC switches an internally preset first SM-SR to the second SM-SR, and accesses the mobile network through the second SM-SR.

According to a fifth aspect, an embodiment of the present invention provides a subscription manager-secure routing device, including:

a first acquiring unit, configured to acquire, from a source subscription manager-secure routing device SM-SR, a profile installer credential corresponding to an embedded universal integrated circuit card eUICC;

a first sending unit, configured to transmit the profile installer credential to a target SM-DP, and send a provisioning profile PP generation request, where the PP generation request is used for instructing the target SM-DP to generate a target PP corresponding to the subscription manager-secure routing device target SM-SR, and encrypt the target PP by using the profile installer credential;

a first receiving unit, configured to: after receiving the target PP, generate a key pair including a first key and a second key, where the first sending unit is further configured to send a third request message to the source SM-SR, where the third request message includes: the encrypted target PP and the first key, and the third request message is used for instructing the source SM-SR to send the encrypted target PP and the first key to the eUICC, so that the eUICC replaces an internally preset source SM-SR according to an SM-SR replacement message sent by the source SM-SR; and the first receiving unit is further configured to receive an access request message sent by the eUICC, where the access request message is sent by the eUICC after the eUICC receives the encrypted target PP and the first key, deactivates or deletes a preset source PP corresponding to the source SM-SR, deletes a first profile management credential corresponding to the source SM-SR, and activates the target PP; and an encryption unit, configured to encrypt, by using the second key, a second profile management credential corresponding to the target SM-SR, where the first sending unit is further configured to send an encrypted second profile management credential to the eUICC, so that the eUICC interacts with the target SM-SR after receiving the second profile management credential, so as to obtain an operational profile OP profile used for accessing a mobile network, and access the mobile network according to the OP profile.

According to a sixth aspect, an embodiment of the present invention provides a terminal, including:

a second receiving unit, configured to receive a subscription manager-secure routing device SM-SR replacement message sent by a source SM-SR, where the SM-SR replacement message includes: an encrypted target provisioning profile PP, a first key, and replacement indication information, where the first key is a key in a key pair generated by a target SM-SR; and the encrypted target PP is a target PP that is acquired by the target SM-SR from a target subscription manager-data preparing device SM-DP, encrypted by the target SM-DP by using a profile installer credential, and used for accessing the target SM-SR;

a processing unit, configured to decrypt the encrypted target PP by using an internally preset credential, deactivate or delete a preset source PP corresponding to the source SM-SR, delete a first profile management credential corresponding to the target SM-SR, and activate the target PP;

a second sending unit, configured to send an access request message to the target SM-SR, where the access request message is used for enabling the target SM-SR to send a second profile management credential corresponding to the target SM-SR, where the second receiving unit is further configured to receive the second profile management credential that is encrypted by the target SM-SR by using a second key in the key pair; and the processing unit is further configured to decrypt the encrypted second profile management credential by using the first key, and interact with the target SM-SR, so as to obtain an operational profile OP profile used for accessing a mobile network; and an access unit, configured to access the mobile network according to the OP profile.

According to a seventh aspect, an embodiment of the present invention provides a subscription manager-secure routing device, including:

a third sending unit, configured to: after receiving trigger information from a subscription manager-secure routing device of an embedded universal integrated circuit card and used for replacing an SM-SR pre-connected to an eUICC, send, to a target SM-SR, a profile installer credential that is stored in the memory and used for encrypting a profile, where the trigger information includes information about the target SM-SR; and a third receiving unit, configured to receive an encrypted target PP and a first key in a key pair that are sent by the target SM-SR, where the encrypted target provisioning profile PP is a target PP that is acquired by the target SM-SR from a target subscription manager-data preparing device SM-DP, encrypted by the target SM-DP by using the profile installer credential, and used for accessing the target SM-SR, and the key pair is keys generated by the target SM-SR and used for ensuring interaction security between the eUICC and the target SM-SR, where the third sending unit is further configured to send an SM-SR replacement message to the eUICC, where the SM-SR replacement message includes: the encrypted target PP, the first key in the key pair, and replacement indication information, so that the eUICC accesses the target SM-SR according to the SM-SR replacement message.

As can be known from the foregoing technical solutions, according to the method and the device for switching a subscription manager-secure routing device in the embodiments of the present invention, a second SM-SR acquires, from a first SM-SR, a profile installer credential corresponding to an eUICC, acquires, from a second SM-DP, a second PP that is encrypted by using the profile installer credential, and generates a key pair including a first key and a second key; the first SM-SR sends the encrypted second PP and the first key to the eUICC, so that the eUICC activates the second PP, and accesses the second SM-SR; and further, the second SM-SR sends, to the eUICC, a second profile management credential that is encrypted by using the second key, so that the eUICC obtains, through the second SM-SR, an OP profile used for accessing a mobile network. In the foregoing processes, it can be ensured that a profile management credential of the second SM-SR (a target SM-SR B) cannot be learned by the first SM-SR (a source SM-SR A) during an SM-SR process of the eUICC, thereby solving a defect in the prior art.

BRIEF DESCRIPTION OF THE DRAWINGS

To describe the technical solutions of the present invention more clearly, the following briefly introduces the accompanying drawings required for describing the embodiments. Apparently, the accompanying drawings in the following description show some embodiments of the present invention, and a person of ordinary skill in the art may still derive, from these accompanying drawings without creative efforts, other drawings that can implement the technical solutions of the present invention.

FIG. 3A to FIG. 3C-B are schematic flowcharts of a method for switching a subscription manager-secure routing device according to another embodiment of the present invention;

FIG. 4A-A to FIG. 4B-B are schematic flowcharts of a method for switching a subscription manager-secure routing device according to another embodiment of the present invention;

DETAILED DESCRIPTION OF ILLUSTRATIVE EMBODIMENTS

Figure 1:
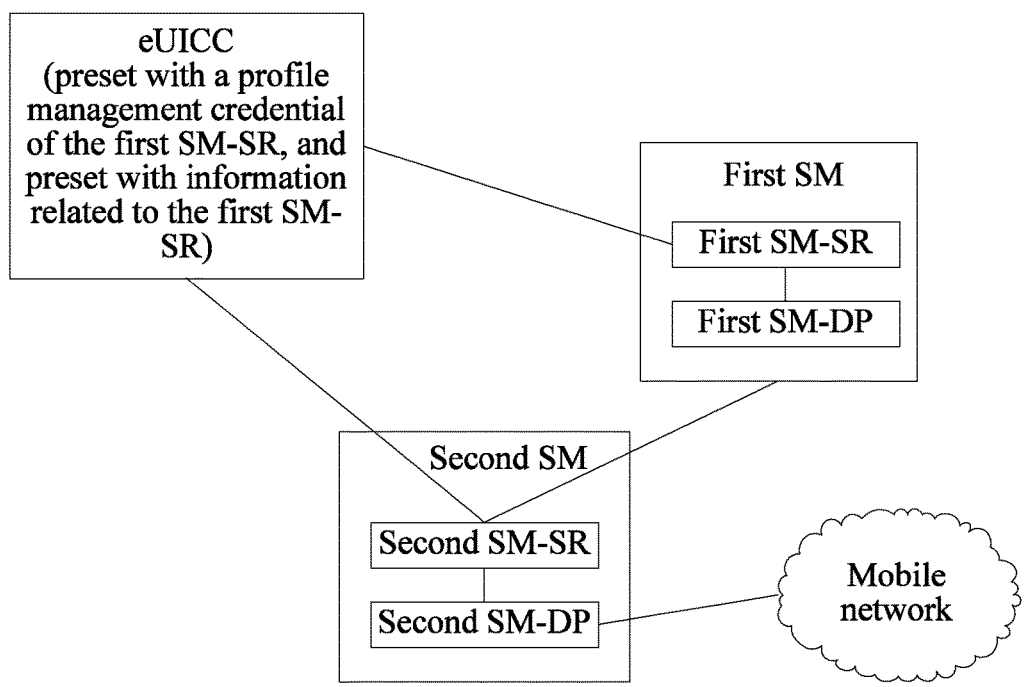
FIG. 1 is a diagram of a scenario in which an eUICC accesses a mobile network according to an embodiment of the present invention.

To make the objectives, technical solutions, and advantages of the present invention clearer, the following clearly describes the technical solutions of the present invention with reference to the accompanying drawings in the embodiments of the present invention. Apparently, the described embodiments are a part of the embodiments of the present invention. Based on the following embodiments of the present invention, a person of ordinary skill in the art can obtain, without creative efforts by making equivalent changes to some or even all technical features, other embodiments that can solve the technical problems of the present invention and achieve the technical effects of the present invention, and these embodiments obtained by making changes apparently do not depart from the scope disclosed in the present invention.

The problems to be solved by the embodiments of the present invention include: 1. how to switch an SM-SR pre-connected to an eUICC; 2. how to ensure that a PMC in a second SM-SR cannot be learned by a first SM-SR in the process of switching the SM-SR pre-connected to the eUICC; and 3. how to download a new PMC (a profile management credential in the second SM-SR) and a second PP to the eUICC.

The foregoing three problems are mutually associated, the second problem and the third problem can be solved at the same time when the first problem is solved, and for details, refer to methods described below.

For devices such as a mobile network, an eUICC, an SM-SR, and an SM-DP that are mentioned in the embodiments of the present invention, each of the foregoing functionalities is briefly explained below.

The eUICC is an embedded UICC, and the eUICC cannot be changed in an existing insertion/removal manner, and needs to be remotely configured.

The SM-SR is configured to implement secure routing of an encrypted profile (a collective term for a series of files and data in the eUICC that are related to the mobile network, an SP, or another third party), and directly manage a profile in the eUICC, for example, an operation such as downloading, deletion, activation, and deactivation.

The subscription manager-data preparing unit (Subscription Manager-Data Preparing, SM-DP for short) is configured to generate a profile, and encrypt the generated profile by using a profile installer credential, that is, perform data preparation for the profile, for example, encrypt the profile, so that only a specified eUICC/a terminal in which the eUICC is located can decrypt the profile.

Generally, one SM-SR and one SM-DP form one SM. Certainly, in other embodiments, one SM may also include multiple SM-SRs and/or multiple SM-DPs.

Herein, profile is a collective term for a series of files and data in the eUICC that are related to a mobile network, for example, the foregoing OP, PP, and the like.

Mobile networks mentioned in the following embodiments are all eUICCs that the eUICC needs to access, and are different from a mobile network corresponding to an SM-SR (a first SM-SR, or an SM-SR A) preset in the eUICC.

Functionalities involved in the following embodiments are described in the following list.

for the eUICC, and is used for ensuring that a profile downloaded from an external entity can be correctly decrypted and installed.

103: After receiving an encrypted second PP sent by the second SM-DP, the second SM-SR generates a key pair including a first key and a second key.

104: The second SM-SR sends a third request message to the first SM-SR, where the third request message includes: the encrypted second PP and the first key, and the third request message is used for instructing the first SM-SR to send the encrypted second PP and the first key to the eUICC, so that the eUICC replaces an internally preset first SM-SR according to an SM-SR replacement message sent by the first SM-SR.

105: The second SM-SR receives an access request message sent by the eUICC, where the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP.

|  | Before switching | After switching |
|---|---|---|
| eUICC (Information about the first SM-SR, and a first PP corresponding to the first SM-SR are preset in the eUICC) | First SM-SR/SM-SR A<br>First SM-DP/SM-DP A<br><br>The following profiles/data correspondingly exist<br>First profile installer credential<br>First profile management credential<br>First PP (including an NAA) | Second SM-SR/SM-SR B<br>Second SM-DP/SM-DP B<br>Mobile network<br>The following profiles/data correspondingly exist<br>Second profile installer credential<br>Second profile management credential<br>Second PP (including an NAA) |

It should be noted that, each of the foregoing functionalities is a certain device or a server.

In addition, eUICC-related information is preset in a service provider (Service Provider, SP for short), for example, an eID of the eUICC, an IMEI of the eUICC, and information, such as an address, a symbol, or a name, about a first SM-SR that is connected to the eUICC by default.

The mobile network matches the second SM-SR, and does not match the first SM-SR, and if the eUICC is connected to the mobile network, the second SM-SR needs to provide a service for the eUICC.

Figure 2:
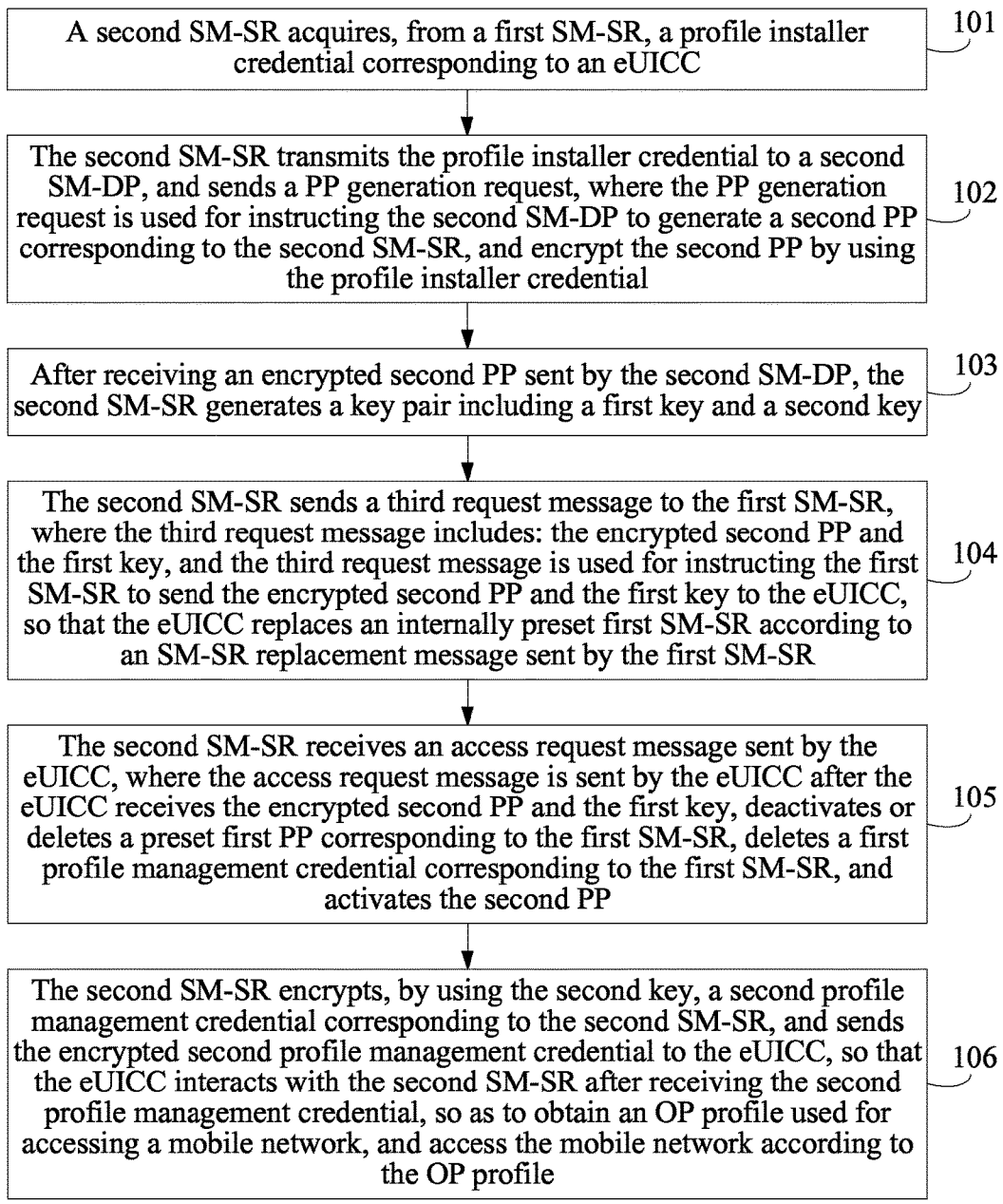
FIG. 2 is a schematic flowchart of a method for switching a subscription manager-secure routing device according to an embodiment of the present invention.

FIG. 1 shows a diagram of a scenario in which an eUICC accesses a mobile network according to an embodiment of the present invention. FIG. 2 shows a schematic flowchart of a method for switching a subscription manager-secure routing device according to an embodiment of the present invention. With reference to FIG. 1 and FIG. 2, the method for switching a subscription manager-secure routing device in this embodiment is described as follows.

101: A second SM-SR acquires, from a first SM-SR, a profile installer credential corresponding to an eUICC.

102: The second SM-SR transmits the profile installer credential to a second SM-DP, and sends a provisioning profile (Provisioning Profile, PP for short) generation request, where the PP generation request is used for instructing the second SM-DP to generate a second PP corresponding to the second SM-SR, and encrypt the second PP by using the profile installer credential.

It should be noted that, the eUICC can access the second SM-SR by using the second PP. The profile installer credential (Profile Installer Credential, PLC for short) is unique

106: The second SM-SR encrypts, by using the second key, a second profile management credential corresponding to the second SM-SR, and sends the encrypted second profile management credential to the eUICC, so that the eUICC interacts with the second SM-SR after receiving the second profile management credential, so as to obtain an OP profile used for accessing a mobile network, and access the mobile network according to the OP profile.

For the eUICC, the profile management credential (Profile Management Credential, PMC for short) is used for establishing a secure communication with the external entity to manage a profile in the eUICC, for example, downloading, activation, deactivation, deletion, and the like.

For example, step 106 may include the following substeps:

1061: The second SM-SR encrypts the second profile management credential by using the second key, and sends the encrypted second profile management credential to the eUICC.

1062: The second SM-SR receives an OP request sent by the eUICC, where the OP request is used for enabling the second SM-SR to acquire the OP profile used for accessing the mobile network.

1063: The second SM-SR sends an OP profile acquiring request to the second SM-DP according to the OP request, where the OP profile acquiring request is used for enabling the second SM-DP to interact with the mobile network, so as to obtain the OP profile.

For example, the OP profile acquiring request is used for enabling the second SM-DP to interact with the mobile network, so as to obtain necessary information for generating the OP profile, and then the second SM-DP generates the OP profile according to the necessary information.

1064: The second SM-SR receives the OP profile that is sent by the second SM-DP and encrypted by using the profile installer credential.

1065: The second SM-SR sends the encrypted operational profile (Operational Profile, OP for short) profile to the eUICC, so that the eUICC accesses the mobile network according to the OP profile.

As can be known from the foregoing embodiment, according to the method for switching a subscription manager-secure routing device in this embodiment, a second SM-SR acquires a profile installer credential from a first SM-SR, acquires, from a second SM-DP, a second PP that is encrypted by using the profile installer credential, and generates a key pair including a first key and a second key; a first SM-SR sends the encrypted second PP and the first key to an eUICC, so that the eUICC activates the second PP, and accesses the second SM-SR; and further, the second SM-SR sends, to the eUICC, a second profile management credential that is encrypted by using the second key, so that the eUICC can obtain, according to the profile management credential, an OP profile used for accessing a mobile network. In the foregoing process, it can be ensured that a profile management credential of the second SM-SR (a target SM-SR B) cannot be learned by the first SM-SR (a source SM-SR A) during an SM-SR process of the eUICC.

Figure 3A:
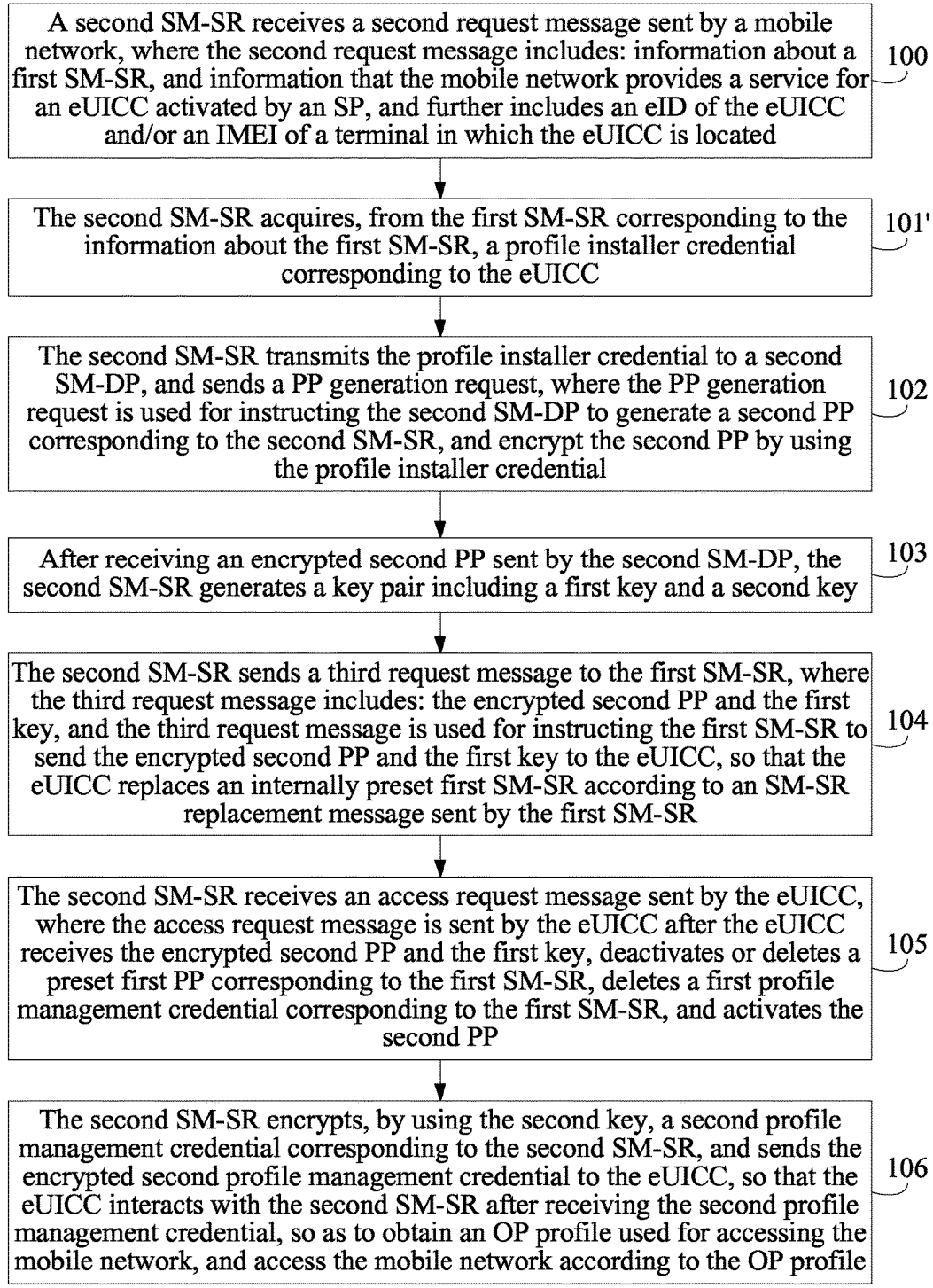

FIG. 3A shows a schematic flowchart of a method for switching a subscription manager-secure routing device according to an embodiment of the present invention. Based on the foregoing embodiment, as shown in FIG. 3A, before step 101, the method for switching a subscription manager-secure routing device in this embodiment further includes the following step 100.

100: The second SM-SR receives a second request message sent by the mobile network, where the second request message includes: information about the first SM-SR, and information that the mobile network provides a service for an eUICC activated by an SP, and further includes an (eUICC Identity, eID for short) of the eUICC and/or an international mobile equipment identity (International Mobile Equipment Identity, IMEI for short) of a terminal in which the eUICC is located.

The information about the first SM-SR, and the eID and/or the IMEI are information carried in a first request message that is sent by the SP after the SP activates the eUICC and received by the mobile network.

For example, the information about the first SM-SR may be an Internet Protocol (Internet Protocol, IP for short) address of the first SM-SR; or the information about the first SM-SR may be information, such as code or a name, of the first SM-SR.

For example, generally, after obtaining the first SM-SR, the second SM-SR implements two-way authentication with the first SM-SR, where the authentication may be implemented in a manner of sending respective authentication information to each other.

Correspondingly, step 101 may specifically be the following step 101'.

101': The second SM-SR acquires, from the first SM-SR corresponding to the information about the first SM-SR, the profile installer credential corresponding to the eUICC.

For example, step 101' may include the following substep S01 and sub-step S02, or sub-step S01' and sub-step S02'.

S01: The second SM-SR sends a first switching request to the first SM-SR, where the first switching request includes information about the second SM-SR.

For example, herein, the information about the second SM-SR may include: authentication information of the second SM-SR, and may further include information, such as code or a name, of the second SM-SR.

The authentication information of the second SM-SR is used by the first SM-SR to confirm that the second SM-SR is a legal device.

S02: The second SM-SR receives a switching response that is sent by the first SM-SR according to the first switching request, where the switching response includes the profile installer credential.

It should be noted that, if the second SM-SR receives the switching response sent by the first SM-SR, it indicates that the authentication performed by the first SM-SR on the second SM-SR succeeds. In an actual application, before receiving the switching response, the second SM-SR also needs to authenticate whether the first SM-SR is legal.

Alternatively,

S01': The second SM-SR sends a first switching request to the first SM-SR, where the first switching request includes information about the second SM-SR.

S02': The second SM-SR receives a switching response that is sent by the first SM-SR according to the first switching request, where the switching response includes the profile installer credential, an eUICC credential used by the second SM-SR to authenticate the eUICC, and an SM-SR credential used by the eUICC to authenticate the SM-SR.

It should be noted that, the eUICC credential may be a credential preset in the first SM-SR and used for proving that the eUICC is a legal device, and the SM-SR credential may be a credential preset in the first SM-SR and used for proving to the eUICC that the SM-SR is a legal device.

In other embodiments, the eUICC credential herein may be a credential acquired by the first SM-SR from the eUICC, which is merely an example for description and is not limited in this embodiment.

Generally, the second SM-SR may be set with another SM-SR credential, which, however, may be not parsed by an eUICC of a switched-from SM-SR herein. The first SM-SR is an SM-SR that is connected to the eUICC by default; therefore, the SM-SR credential in the first SM-SR is authenticated by the eUICC, and the second SM-SR needs to acquire an SM-SR credential in the first SM-SR and used by the eUICC to authenticate the SM-SR.

FIG. 3B-A and FIG. 3B-B show a schematic flowchart of a method for switching a subscription manager-secure routing device according to an embodiment of the present invention. Based on the foregoing embodiment, as shown in FIG. 3B-A and FIG. 3B-B, before step 101, the method for switching a subscription manager-secure routing device in this embodiment further includes the following step 100 to step 100*a*.

100: The second SM-SR receives a second request message sent by the mobile network, where the second request message includes: information about the first SM-SR, and information that the mobile network provides a service for an eUICC activated by an SP, and further includes an eID of the eUICC and/or an IMEI of a terminal in which the eUICC is located.

The information about the first SM-SR, and the eID and/or the IMEI are information in a first request message that is sent by the SP after the SP activates the eUICC and received by the mobile network.

It should be noted that, the eID and/or the IMEI is an identification identifier of the eUICC, and the first SM-SR or the mobile network or the SP identifies the eUICC according to these identification identifiers.

100a: After the second SM-SR determines that the first SM-SR is a legal SM-SR, the second SM-SR sends, to the first SM-SR, a first switching request used for replacing an SM-SR pre-connected to the eUICC, where the first switching request includes: authentication information of the second SM-SR, and further includes: the eID and/or the IMEI, so that the first SM-SR determines according to the authentication information of the second SM-SR that the second SM-SR is a legal SM-SR, and determines to replace the SM-SR pre-connected to the eUICC for the eUICC.

For example, in step 100a, that the second SM-SR determines that the first SM-SR is a legal SM-SR may be that the second SM-SR sends an authentication request to the first SM-SR corresponding to the information about the first SM-SR, and then, the first SM-SR returns authentication information of the first SM-SR according to the authentication request, so that the second SM-SR determines that the first SM-SR is a legal SM-SR.

In other embodiments, in step 100a, the second SM-SR determines that the first SM-SR is a legal SM-SR, and in addition, the first SM-SR also needs to determine that the second SM-SR is a legal device, and after the two-way authentication, subsequent interaction is implemented, that is, step 100a may also be the following content:

After the second SM-SR determines that the first SM-SR is a legal SM-SR, the second SM-SR sends, to the first SM-SR, a first switching request used for replacing an SM-SR pre-connected to the eUICC, where the first switching request includes: the eID and/or the IMEI, so that the first SM-SR determines to replace the SM-SR pre-connected to the eUICC for the eUICC.

Alternatively, after the second SM-SR and the first SM-SR implement the two-way authentication, the second SM-SR sends, to the first SM-SR, a first switching request used for replacing an SM-SR pre-connected to the eUICC, where the first switching request includes: the eID and/or the IMEI, so that the first SM-SR determines to replace the SM-SR pre-connected to the eUICC for the eUICC.

Correspondingly, step 101 may specifically be the following step 101".

101": The second SM-SR receives a switching response that is sent by the first SM-SR according to the first switching request, where the switching response includes the profile installer credential; or the second SM-SR receives a switching response that is sent by the first SM-SR according to the first switching request, where the switching response includes: the profile installer credential, an eUICC credential used by the second SM-SR to authenticate the eUICC, and an SM-SR credential used by the eUICC to authenticate the SM-SR.

In an optional application scenario, based on the foregoing embodiment, as shown in FIG. 3C-A and FIG. 3C-B, before step 105, the method for switching a subscription manager-secure routing device in this embodiment may further include the following step 105a.

105a: The second SM-SR determines according to the eUICC credential that the eUICC is a legal device.

Further, step 106 may be the following 106'.

106': The second SM-SR encrypts, by using the second key, the second profile management credential corresponding to the second SM-SR, and sends the encrypted second profile management credential and the SM-SR credential to the eUICC, so that the eUICC interacts with the second SM-SR after determining according to the SM-SR credential that the second SM-SR is a legal SM-SR, so as to obtain the OP profile for accessing the mobile network, and access the mobile network according to the OP profile.

According to the method for switching a subscription manager-secure routing device listed in FIG. 3A to FIG. 3C-B, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

FIG. 4A-A and FIG. 4A-B show a schematic flowchart of a method for switching a subscription manager-secure routing device according to an embodiment of the present invention. Based on the foregoing embodiment, as shown in FIG. 4A-A and FIG. 4A-B, before step 101, the method for switching a subscription manager-secure routing device in this embodiment further includes the following step 200 to step 200c.

200: The second SM-SR receives a second switching request that is sent by the first SM-SR and used for replacing an SM-SR pre-connected to the eUICC, where the second switching request includes: authentication information of the first SM-SR, and further includes: the eID and/or the IMEI.

200a: If the second SM-SR determines according to the authentication information of the first SM-SR that the first SM-SR is a legal SM-SR, the second SM-SR sends a query message to the second SM-DP, where the query message is used for instructing the second SM-DP to query the mobile network about whether the mobile network can provide a service for an eUICC corresponding to the eID or the IMEI, and the query message includes: the eID and/or the IMEI.

For example, when the second SM-DP queries the mobile network about information whether the mobile network can provide the service for the eUICC corresponding to the eID, the second SM-DP first converts the eID into an integrated circuit card identity (Integrate circuit card identity, ICCID for short) that can be identified by the mobile network, and further sends a query request including the ICCID to the mobile network, so that the mobile network determines according to the query request whether the mobile network can provide the service for the eUICC corresponding to the ICCID.

That is, currently, the mobile network identifies a UICC by using an ICCID; however, a coding rule of an eID may be different from that of the ICCID; therefore, the second SM-DP needs to perform conversion.

200b: When the mobile network determines that the mobile network can provide the service for the eUICC, the second SM-SR receives a query result returned by the second SM-DP, where the query result includes: information that the mobile network can provide the service for the eUICC.

200c: After receiving the query result, the second SM-SR sends a response to the second switching request to the first SM-SR, where the response includes: authentication information of the second SM-SR, and further includes the eID and/or the IMEI, so that the first SM-SR determines according to the authentication information of the second SM-SR that the second SM-SR is a legal SM-SR, and determines to replace the SM-SR pre-connected to the eUICC for the eUICC.

In addition, in step 200a, the second SM-SR determines according to the authentication information of the first SM-SR that the first SM-SR is a legal SM-SR, and in addition, the first SM-SR may also interact with the second SM-SR to determine that the second SM-SR is a legal SM-SR; in this case, step 200c may be the following content:

After receiving the query result, the second SM-SR sends a response to the second switching request to the first SM-SR, where the response includes: the eID and/or the IMEI, so that the first SM-SR determines to replace the SM-SR pre-connected to the eUICC for the eUICC.

The foregoing embodiment is merely an example for description, in an actual application, an order of the steps may be changed, and the order of the steps is not limited in this embodiment.

According to the method for switching a subscription manager-secure routing device listed in FIG. 4A-A and FIG. 4A-B, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

FIG. 4B-A and FIG. 4B-B shows a schematic flowchart of a method for switching a subscription manager-secure routing device according to an embodiment of the present invention. Based on the foregoing embodiment, as shown in FIG. 4B-A and FIG. 4B-B, before step 101, the method for switching a subscription manager-secure routing device in this embodiment further includes the following step 300 to step 300c.

300: The second SM-SR receives a third switching request that is sent by a service provider (Service Provider, SP for short) after the SP activates the eUICC and used for replacing an SM-SR pre-connected to the eUICC, where the third switching request includes: information about the first SM-SR, and further includes: the eID and/or the IMEI.

300a: After determining that the first SM-SR is a legal SM-SR, the second SM-SR sends a query message to the second SM-DP, where the query message is used for instructing the second SM-DP to query the mobile network about whether the mobile network can provide a service for an eUICC corresponding to the eID or the IMEI, and the query message includes: the eID and/or the IMEI.

300b: When the mobile network determines that the mobile network can provide the service for the eUICC, the second SM-SR receives a query result returned by the second SM-DP, where the query result includes: information that the mobile network can provide the service for the eUICC.

300c: After receiving the query result, the second SM-SR sends, to the first SM-SR, a first switching request used for replacing the SM-SR pre-connected to the eUICC, where the first switching request includes: authentication information of the second SM-SR, and further includes: the eID and/or the IMEI, so that the first SM-SR determines according to the authentication information of the second SM-SR that the second SM-SR is a legal SM-SR, and determines to replace the SM-SR pre-connected to the eUICC for the eUICC.

Certainly, in another possible implementation scenario, step 300' to step 300c' are described as follows:

300': The second SM-SR receives a third switching request that is sent by an SP after the SP activates the eUICC and used for replacing an SM-SR pre-connected to the eUICC, where the third switching request includes: information about the first SM-SR, and further includes: the eID and/or the IMEI.

300a': After determining that the first SM-SR is a legal SM-SR, the second SM-SR sends a query message to the second SM-DP, where the query message is used for instructing the second SM-DP to query the mobile network about whether the mobile network can provide a service for an eUICC corresponding to the eID or the IMEI, and the query message includes: the eID and/or the IMEI.

In step 300a', the second SM-SR and the first SM-SR implement the two-way authentication, that is, at the same time when the second SM-SR determines that the first SM-SR is a legal SM-SR, the first SM-SR also determines that the second SM-SR is a legal SM-SR.

That is, the second SM-SR acquires the authentication information of the first SM-SR, and determines according to the authentication information of the first SM-SR that the first SM-SR is a legal SM-SR, and at the same time, the first SM-SR acquires authentication information of the second SM-SR, so that the first SM-SR determines according to the authentication information of the second SM-SR that the second SM-SR is a legal SM-SR.

300b': When the mobile network determines that the mobile network can provide the service for the eUICC, the second SM-SR receives a query result returned by the second SM-DP, where the query result includes: information that the mobile network can provide the service for the eUICC.

300c': After receiving the query result, the second SM-SR sends, to the first SM-SR, a first switching request used for replacing the SM-SR pre-connected to the eUICC, where the first switching request includes: the eID and/or the IMEI, so that the first SM-SR determines to replace the SM-SR pre-connected to the eUICC for the eUICC.

According to the method for switching a subscription manager-secure routing device listed in FIG. 4B-A and FIG. 4B-B, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

Figure 5A:
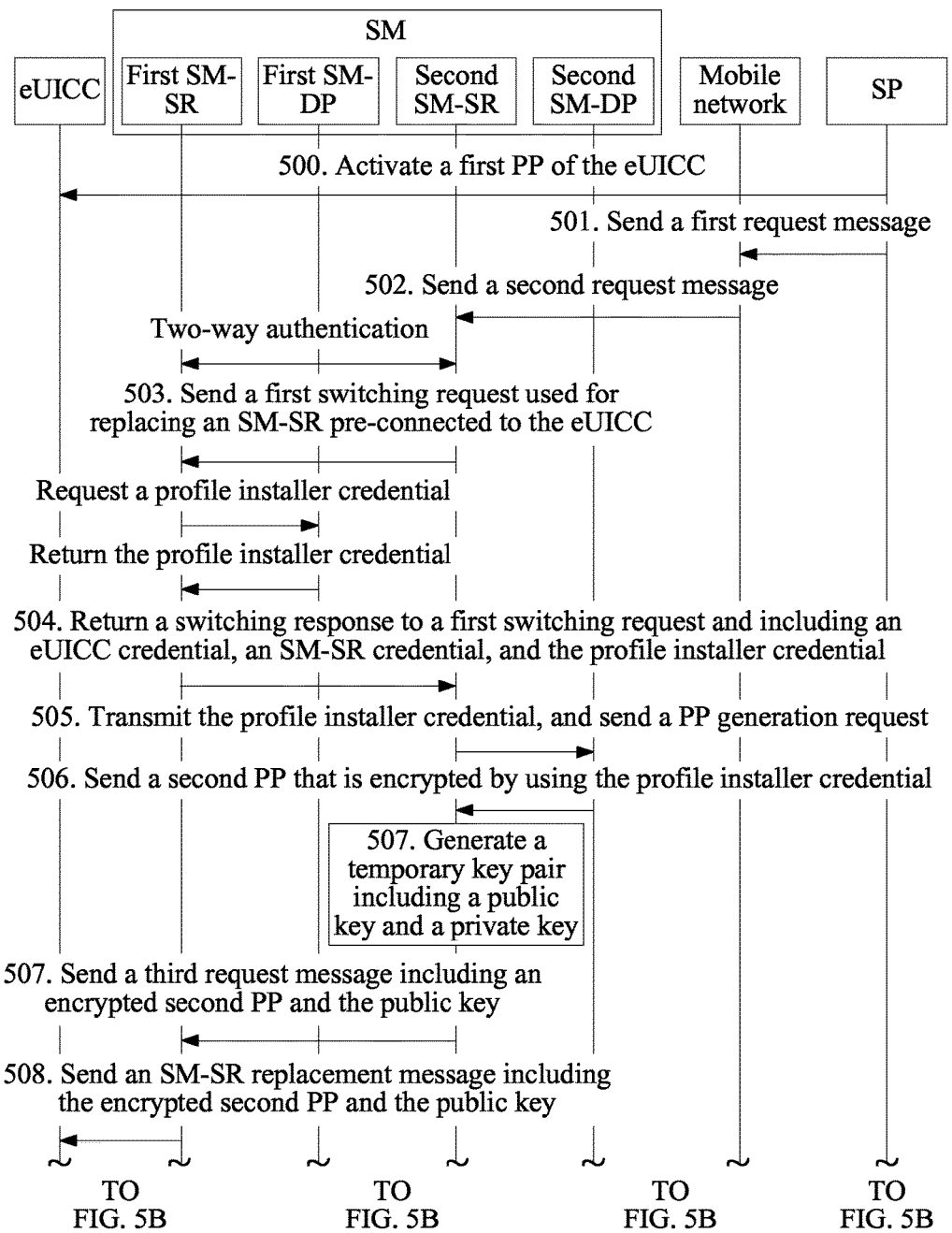
FIG. 5A and FIG. 5B are a schematic flowchart of a method for switching a subscription manager-secure routing device according to another embodiment of the present invention.
Figure 5B:
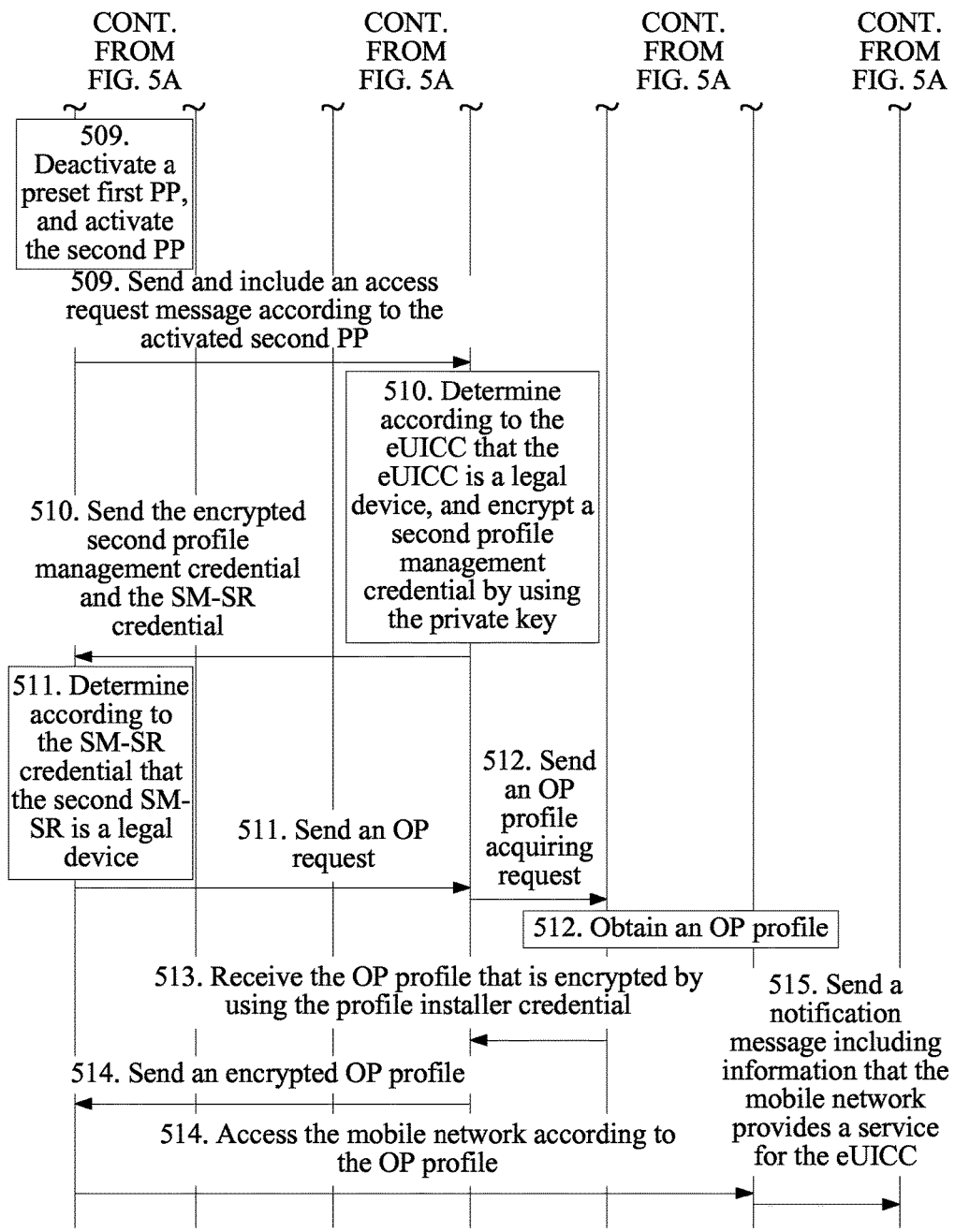

FIG. 5A and FIG. 5B show a schematic flowchart of a method for switching a subscription manager-secure routing device according to an embodiment of the present invention. As shown in FIG. 5A and FIG. 5B, the method for switching a subscription manager-secure routing device in this embodiment further includes the following content.

500: An SP activates a first provisioning profile (Provisioning Profile, PP for short) A in an eUICC, including activating a network access application (Network Access Application, NAA for short) in the first PP thereof.

Herein, the first PP is a profile used by the eUICC to access a first SM-SR.

501: After the SP activates the first PP in the eUICC, the SP sends, to a mobile network, a first request message used for providing a service for the eUICC, where the first request message includes: an eID of the eUICC, an IMEI of a terminal in which the eUICC is located, and information (such as code, a name, or address information) of a first SM-SR preset in the eUICC.

502: The mobile network sends a second request message to a second SM-SR, where the second request message includes: the eID, the IMEI of the terminal in which the eUICC is located, information about the first SM-SR, and information that the mobile network provides a service for an eUICC activated by the SP.

It can be understood that, the mobile network is a network related to the second SM-SR; therefore, content related to the second SM-SR, and the like are preset in the mobile network.

503: After receiving the second request message, the second SM-SR sends, to the first SM-SR, a first switching request used for replacing an SM-SR pre-connected to the eUICC, where the switching request includes authentication information of the second SM-SR, the eID, and the IMEI of the terminal in which the eUICC is located.

It should be noted that, after receiving the second request message, the second SM-SR first needs to determine that the first SM-SR is a legal SM-SR; in this case, the second SM-SR may send an authentication request to the first SM-SR corresponding to the information about the first SM-SR in 501, so as to acquire authentication information of the first SM-SR, determine that the first SM-SR is a legal SM-SR, and then send the first switching request.

In other embodiments, the second SM-SR herein and the first SM-SR can implement two-way authentication, and the authentication may be separately described in some steps for ease of description in this embodiment. It should be understood that, this embodiment is merely an example for description, and does not limit an order of some steps.

504: The first SM-SR determines according to the authentication information of the second SM-SR that the second SM-SR is a legal SM-SR, and sends a switching response to the first switching request to the second SM-SR, where the switching response includes: an eUICC credential, an SM-SR credential, and a profile installer credential.

The eUICC credential is used by the second SM-SR to authenticate the eUICC.

The SM-SR credential is used by the eUICC to authenticate an SM-SR to be accessed.

Optionally, after the first SM-SR determines according to the authentication information of the second SM-SR that the second SM-SR is a legal SM-SR, the first SM-SR sends a profile installer credential acquiring request to a first SM-DP, where the profile installer credential acquiring request includes the eID and the IMEI of the terminal in which the eUICC is located, and the first SM-DP returns the profile installer credential to the first SM-SR according to the profile installer credential acquiring request.

505: The second SM-SR transmits the profile installer credential to a second SM-DP, and sends a PP generation request to the second SM-DP, where the PP generation request is used for instructing the second SM-DP to generate a second PP corresponding to the second SM-SR, and encrypt the second PP by using the profile installer credential.

506: The second SM-DP generates the second PP according to the PP generation request, encrypts the second PP by using the profile installer credential, and sends an encrypted second PP to the second SM-SR.

507: After receiving the encrypted second PP sent by the second SM-DP, the second SM-SR generates a temporary key pair including a public key and a private key, and sends a third request message to the first SM-SR, where the third request message includes: the encrypted second PP and the public key, and the third request message is used for instructing the first SM-SR to send the encrypted second PP and the public key to the eUICC.

508: The first SM-SR sends an SM-SR replacement message to the eUICC, where the SM-SR replacement message is used for instructing the eUICC to replace an SM-SR, and the SM-SR replacement message includes: the encrypted second PP and the public key in the temporary key pair.

509: After receiving the SM-SR replacement message, the eUICC deactivates or deletes the first PP, deletes a profile management credential of the first SM-SR, and decrypts and activates the second PP, and sends an access request message to the second SM-SR according to the activated second PP, where the access request message is used for enabling the second SM-SR to send a second profile management credential corresponding to the second SM-SR.

510: After determining according to the eUICC credential in step 504 that the eUICC is a legal device, the second SM-SR receives the access request message sent by the eUICC; in this case, the second SM-SR encrypts, by using the private key in the temporary key pair, the second profile management credential corresponding to the second SM-SR, and sends the encrypted second profile management credential and the SM-SR credential in step 504 to the eUICC.

511: If the eUICC determines according to the received SM-SR credential that the second SM-SR is a legal device, the eUICC sends an OP request to the second SM-SR, where the OP request is used for enabling the second SM-SR to acquire an OP profile used for accessing the mobile network.

512: The second SM-SR sends an OP profile acquiring request to the second SM-DP according to the OP request, where the OP profile acquiring request is used for enabling the second SM-DP to interact with the mobile network, so as to obtain the OP profile.

For example, the OP profile acquiring request is used for enabling the second SM-DP to interact with the mobile network, so as to obtain necessary information for generating the OP profile, and then the second SM-DP generates the OP profile according to the necessary information.

513: The second SM-SR receives the OP profile that is sent by the second SM-DP and encrypted by using the profile installer credential.

514: The second SM-SR sends an encrypted OP profile to the eUICC, so that the eUICC accesses the mobile network according to the OP profile.

515: The mobile network sends a notification message to the SP, where the notification message includes information that the mobile network provides the service for the eUICC.

According to the method for switching a subscription manager-secure routing device listed in FIG. 5A and FIG. 5B, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

Figure 6A:
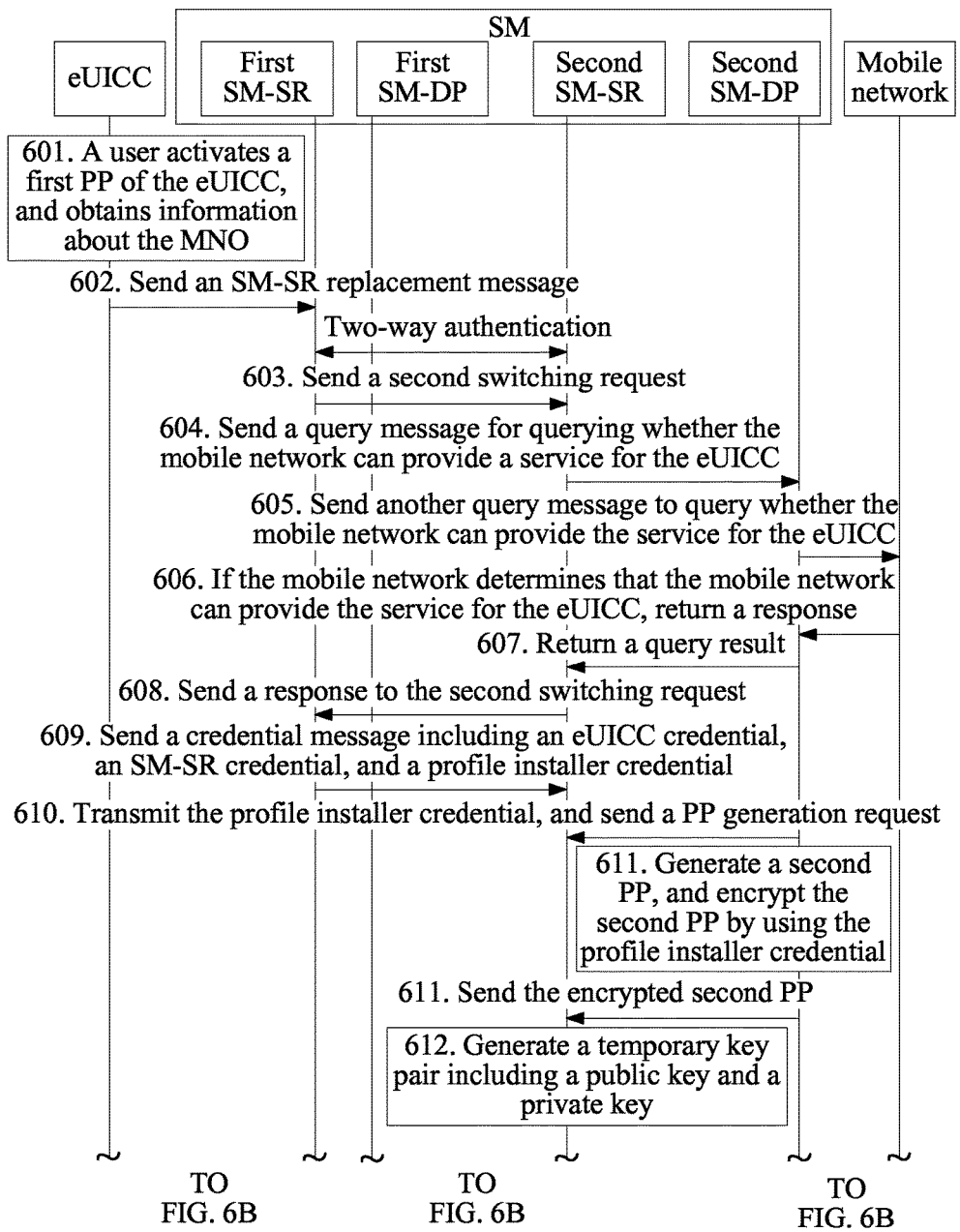
FIG. 6A and FIG. 6B are a schematic flowchart of a method for switching a subscription manager-secure routing device according to another embodiment of the present invention.
Figure 6B:
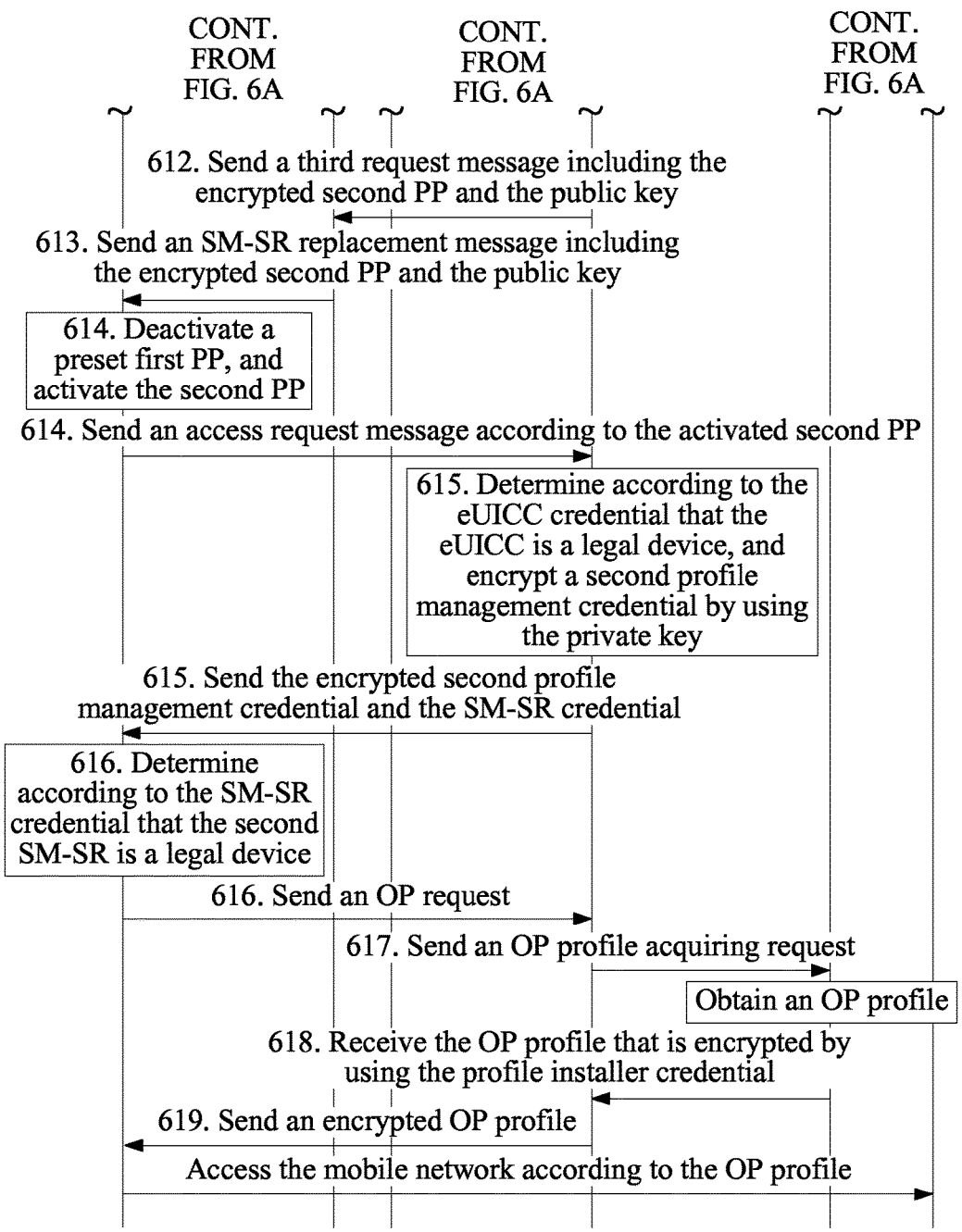

FIG. 6A and FIG. 6B show a schematic flowchart of a method for switching a subscription manager-secure routing device according to an embodiment of the present invention. As shown in FIG. 6A and FIG. 6B, the method for switching a subscription manager-secure routing device in this embodiment further includes the following content.

601: A user activates a first PP in an eUICC, including activating an NAA in the first PP in the eUICC, and the eUICC obtains information about a mobile network.

For example, the information about the mobile network obtained by the eUICC may be information about the mobile network input by the user, or information about the mobile network obtained in another manner.

The information about the mobile network may be a number of a public land mobile network (Public Land Mobile Network, PLMN for short) owned by the mobile network or a name of the mobile network, for example, China Mobile or the like, and it is publicly known that information about a second SM-SR corresponding to the mobile network is learnt from the information about the mobile network.

602: The eUICC sends an SM-SR replacement message to a first SM-SR, where the SM-SR replacement message includes: an eID, an IMEI of a terminal in which the eUICC is located, and the information about the mobile network.

603: The first SM-SR determines according to the information about the mobile network in the SM-SR replacement message that the first SM-SR is an SM-SR used by the mobile network, and sends a second switching request to the second SM-SR, where the second switching request includes: the eID, the IMEI, and authentication information of the first SM-SR.

604: If the second SM-SR confirms according to the authentication information of the first SM-SR that the first SM-SR is a legal SM-SR, the second SM-SR sends a query message to a second SM-DP, where the query message is used for instructing the second SM-DP to query the mobile network about whether the mobile network can provide a service for the eUICC corresponding to the eID and the IMEI, and the query message includes: the eID and the IMEI.

605: What the second SM-DP sends to the mobile network according to the query message should be another query message, where the another query message is used for instructing the mobile network to query whether the mobile network can provide the service for the eUICC, and the another query message includes an ICCID into which the SM-DP converts the eID, and the IMEI.

606: The mobile network determines whether the mobile network can provide the service for the eUICC corresponding to the ICCID and the IMEI, and if yes, the mobile network returns a response to the another query message to the second SM-DP.

607: When the mobile network determines that the mobile network can provide the service for the eUICC, the second SM-SR receives a query result returned by the second SM-DP, where the query result includes: information that the mobile network can provide the service for the eUICC.

608: After receiving the query result, the second SM-SR sends a response to the second switching request to the first SM-SR, where the response includes: authentication information of the second SM-SR, and further includes the eID and the IMEI.

609: The first SM-SR determines according to the authentication information of the second SM-SR that the second SM-SR is a legal SM-SR, and sends the credential message to the second SM-SR, where the credential message includes: an eUICC credential, an SM-SR credential, and a profile installer credential.

The eUICC credential is used by the second SM-SR to authenticate the eUICC.

The SM-SR credential is used by the eUICC to authenticate an SM-SR to be accessed.

610: The second SM-SR transmits the profile installer credential to the second SM-DP, and sends a PP generation request to the second SM-DP, where the PP generation request is used for instructing the second SM-DP to generate a second PP corresponding to the second SM-SR, and encrypt the second PP by using the profile installer credential.

611: The second SM-DP generates the second PP according to the PP generation request, encrypts the second PP by using the profile installer credential, and sends an encrypted second PP to the second SM-SR.

612: After receiving the encrypted second PP sent by the second SM-DP, the second SM-SR generates a temporary key pair including a public key and a private key, and sends a third request message to the first SM-SR, where the third request message includes: the encrypted second PP and the public key, and the third request message is used for instructing the first SM-SR to send the encrypted second PP and the public key to the eUICC.

613: The first SM-SR sends the SM-SR replacement message to the eUICC, where the SM-SR replacement message is used for instructing the eUICC to replace an SM-SR, and the SM-SR replacement message includes: the encrypted second PP and the public key in the temporary key pair.

614: After receiving the SM-SR replacement message, the eUICC deactivates or deletes the first PP, deletes a profile management credential of the first SM-SR, and decrypts and activates the second PP, and sends an access request message to the second SM-SR according to the activated second PP, where the access request message is used for enabling the second SM-SR to send a second profile management credential corresponding to the second SM-SR.

615: After determining according to the eUICC credential in step 609 that the eUICC is a legal device, the second SM-SR receives the access request message sent by the eUICC; in this case, the second SM-SR encrypts, by using the private key in the temporary key pair, the second profile management credential corresponding to the second SM-SR, and sends the encrypted second profile management credential and the SM-SR credential in step 609 to the eUICC.

616: If the eUICC determines according to the received SM-SR credential that the second SM-SR is a legal device, the eUICC sends an OP request to the second SM-SR, where the OP request is used for enabling the second SM-SR to acquire an OP profile used for accessing the mobile network.

617: The second SM-SR sends an OP profile acquiring request to the second SM-DP according to the OP request, where the OP profile acquiring request is used for enabling the second SM-DP to interact with the mobile network, so as to obtain the OP profile.

618: The second SM-SR receives the OP profile that is sent by the second SM-DP and encrypted by using the profile installer credential.

619: The second SM-SR sends an encrypted OP profile to the eUICC, so that the eUICC accesses the mobile network according to the OP profile.

According to the method for switching a subscription manager-secure routing device listed in FIG. 6A and FIG. 6B, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

Figure 7:
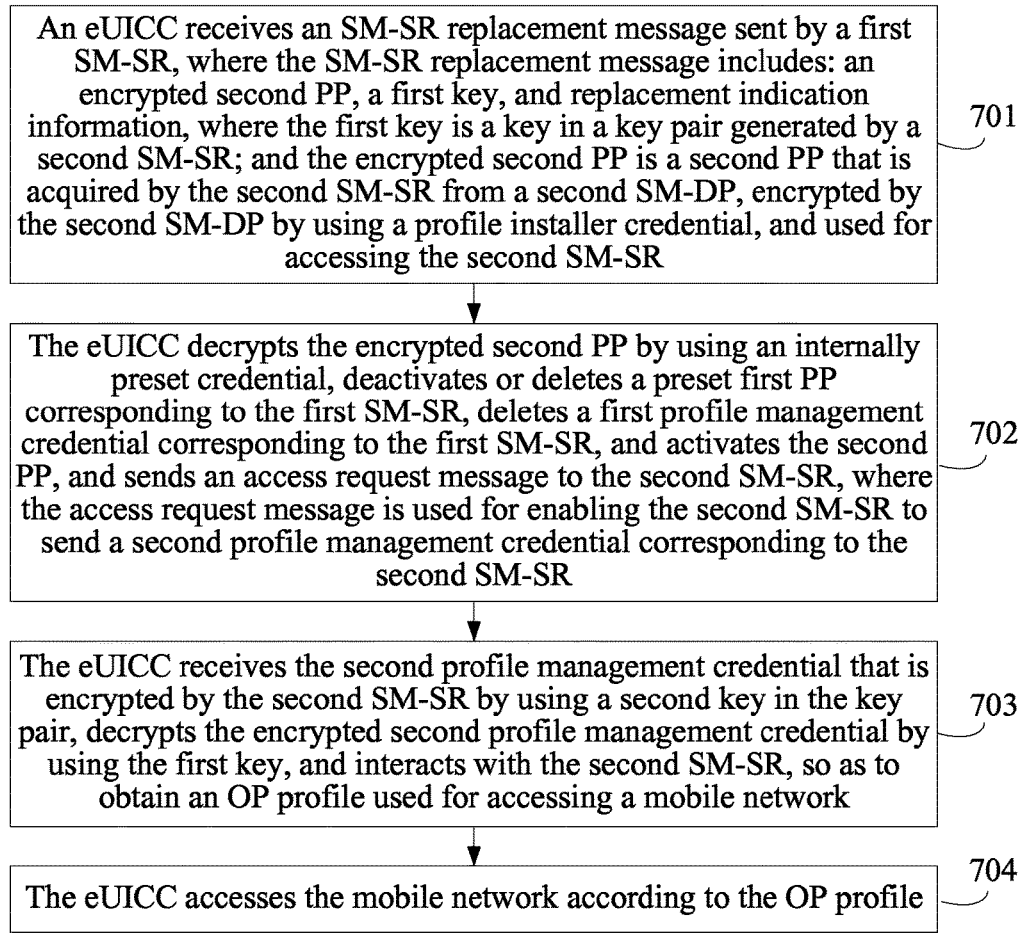
FIG. 7 is a schematic flowchart of a method for switching a subscription manager-secure routing device according to another embodiment of the present invention.

FIG. 7 shows a schematic flowchart of a method for switching a subscription manager-secure routing device according to an embodiment of the present invention. As shown in FIG. 7, the method for switching a subscription manager-secure routing device in this embodiment further includes the following content.

701: An eUICC receives an SM-SR replacement message sent by a first SM-SR, where the SM-SR replacement message includes: an encrypted second PP, a first key, and replacement indication information, where the first key is a key in a key pair generated by a second SM-SR; and the encrypted second PP is a second PP that is acquired by the second SM-SR from a second SM-DP, encrypted by the second SM-DP by using a profile installer credential, and used for accessing the second SM-SR.

702: The eUICC decrypts the encrypted second PP by using an internally preset credential, deactivates or deletes a preset first PP corresponding to the first SM-SR, deletes a first profile management credential corresponding to the first SM-SR, activates the second PP, and sends an access request message to the second SM-SR, where the access request message is used for enabling the second SM-SR to send a second profile management credential corresponding to the second SM-SR.

703: The eUICC receives the second profile management credential that is encrypted by the second SM-SR by using a second key in the key pair, decrypts the encrypted second profile management credential by using the first key, and interacts with the second SM-SR, so as to obtain an OP profile used for accessing a mobile network.

704: The eUICC accesses the mobile network according to the OP profile.

Optionally, in step 703, that the eUICC receives the second profile management credential that is encrypted by the second SM-SR by using a second key in the key pair may include:

M01: The eUICC receives the second profile management credential that is encrypted by the second SM-SR by using the second key in the key pair, and receives an SM-SR credential sent by the second SM-SR and used by the eUICC to authenticate the SM-SR.

Correspondingly, in step 703, that the encrypted second profile management credential is decrypted by using the first key, and interaction is performed with the second SM-SR may include:

M02: After determining according to the SM-SR credential that the second SM-SR is a legal SM-SR, the eUICC decrypts the encrypted second profile management credential by using the first key, and interacts with the second SM-SR.

In an exemplary application scenario, in step 703, that interaction is performed with the second SM-SR, so as to obtain an OP profile used for accessing a mobile network may include:

M03: The eUICC sends an operational profile (Operational Profile, OP for short) request to the second SM-SR, where the OP request is used for enabling the second SM-SR to acquire the OP profile used for accessing the mobile network.

M04: The eUICC receives the OP profile sent by the second SM-SR and used for accessing the mobile network, where the OP profile is a profile obtained by the second SM-SR from the mobile network through the second SM-DP.

Optionally, in an application scenario, before step 701, the method for switching a subscription manager-secure routing device in this embodiment may further include the following step 700 that is not shown in the figure.

700: After an internally preset first PP is activated and information about the mobile network is obtained, the eUICC sends an SM-SR change request to the first SM-SR, where the SM-SR change request includes: the information about the mobile network, and further includes: an eID of the eUICC and/or an IMEI of a terminal in which the eUICC is located, so that the first SM-SR interacts with the second SM-SR, so as to implement access of the eUICC to the second SM-SR, and implement access of the eUICC to the mobile network.

According to the method for switching a subscription manager-secure routing device listed in FIG. 7, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

Figure 8:
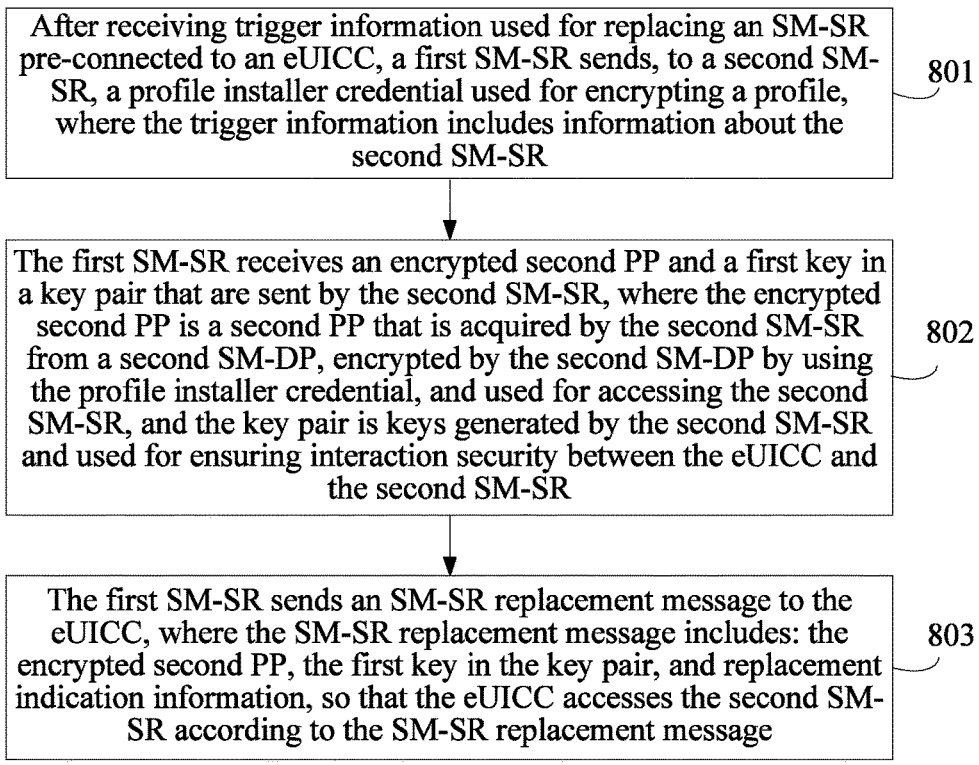
FIG. 8 is a schematic flowchart of a method for switching a subscription manager-secure routing device according to another embodiment of the present invention.

FIG. 8 shows a schematic flowchart of a method for switching a subscription manager-secure routing device according to an embodiment of the present invention. As shown in FIG. 8, the method for switching a subscription manager-secure routing device in this embodiment further includes the following content.

801: After receiving trigger information used for replacing an SM-SR pre-connected to an eUICC, a first SM-SR sends, to a second SM-SR, a profile installer credential used for encrypting a profile, where the trigger information includes information about the second SM-SR.

802: The first SM-SR receives an encrypted second PP and a first key in a key pair that are sent by the second SM-SR, where the encrypted second PP is a second PP that is acquired by the second SM-SR from a second SM-DP, encrypted by the second SM-DP by using the profile installer credential, and used for accessing the second SM-SR, and the key pair is keys generated by the second SM-SR and used for ensuring interaction security between the eUICC and the second SM-SR.

803: The first SM-SR sends an SM-SR replacement message to the eUICC, where the SM-SR replacement message includes: the encrypted second PP, the first key in the key pair, and replacement indication information, so that the eUICC accesses the second SM-SR according to the SM-SR replacement message.

Optionally, before step 801, the method for switching a subscription manager-secure routing device in this embodiment may further include the following step 800 that is not shown in the figure.

800: The first SM-SR receives the trigger information used for replacing the SM-SR pre-connected to the eUICC, where the trigger information is a first switching request sent by the second SM-SR to the first SM-SR according to information about the first SM-SR;

or, the first SM-SR receives the trigger information used for replacing the SM-SR pre-connected to the eUICC, where the trigger information is a second switching request sent by the eUICC to the first SM-SR according to obtained information about the mobile network.

Optionally, in another application scenario, before step 801, the method for switching a subscription manager-secure routing device in this embodiment may further include the following step 800a that is not shown in the figure.

800a: The first SM-SR determines according to the information (for example, authentication information) of the second SM-SR in the trigger information that the second SM-SR is a legal SM-SR;

and/or the first SM-SR sends a profile installer credential acquiring request to a first SM-DP, and receives a profile installer credential sent by the first SM-DP and corresponding to the eUICC, where the profile installer credential acquiring request includes an eID of the eUICC and/or an IMEI of a terminal in which the eUICC is located.

The eUICC credential is used by the second SM-SR to authenticate the eUICC.

The SM-SR credential is used by the eUICC to authenticate an SM-SR to be accessed.

According to the method for switching a subscription manager-secure routing device listed in FIG. 8, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

Figure 9:
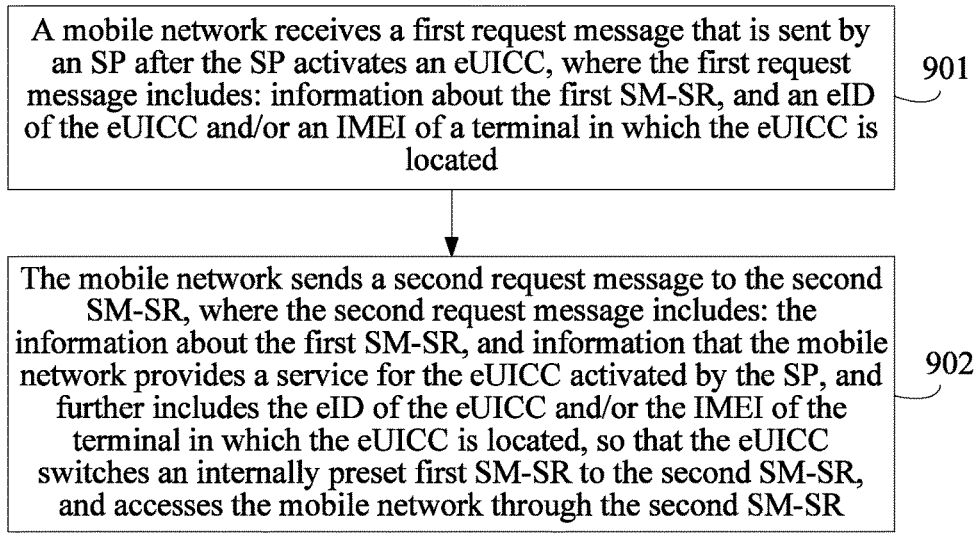
FIG. 9 is a schematic flowchart of a method for switching a subscription manager-secure routing device according to another embodiment of the present invention.

FIG. 9 shows a schematic flowchart of a method for switching a subscription manager-secure routing device according to an embodiment of the present invention. As shown in FIG. 9, the method for switching a subscription manager-secure routing device in this embodiment further includes the following content.

A mobile network is a mobile network corresponding to a second SM-SR.

901: The mobile network receives a first request message that is sent by an SP after the SP activates an eUICC, where the first request message includes: information about the first SM-SR, and an eID of the eUICC and/or an IMEI of a terminal in which the eUICC is located.

902: The mobile network sends a second request message to the second SM-SR, where the second request message includes: the information about the first SM-SR, and information that the mobile network provides a service for the eUICC activated by the SP, and further includes the eID of the eUICC and/or the IMEI of the terminal in which the eUICC is located, so that the eUICC switches an internally preset first SM-SR to the second SM-SR, and accesses the mobile network through the second SM-SR.

Optionally, in another embodiment, the method for switching a subscription manager-secure routing device may further include the following step 903 and step 904 that are not shown in the figure.

903: The mobile network receives a profile generation request sent by a second SM-DP and used for enabling the eUICC to connect to the mobile network, where the profile generation request includes an ICCID and/or the IMEI, where the ICCID is an ICCID that is converted from the eID by the second SM-DP and can be identified by the mobile network.

904: The mobile network sends, to the second SM-DP, an OP profile that is required by the eUICC to connect to the mobile network.

The mobile network receives a network access request that is sent by the eUICC according to the OP profile, and enables the eUICC to access the mobile network according to the network access request.

According to the method for switching a subscription manager-secure routing device listed in FIG. 9, it can be ensured that a profile management credential of a second SM-SR cannot be learned by a first SM-SR during an SM-SR process of an eUICC, and in addition, mutual authentication between devices can be implemented, thereby ensuring that the interacting devices are only legal devices.

Figure 10:
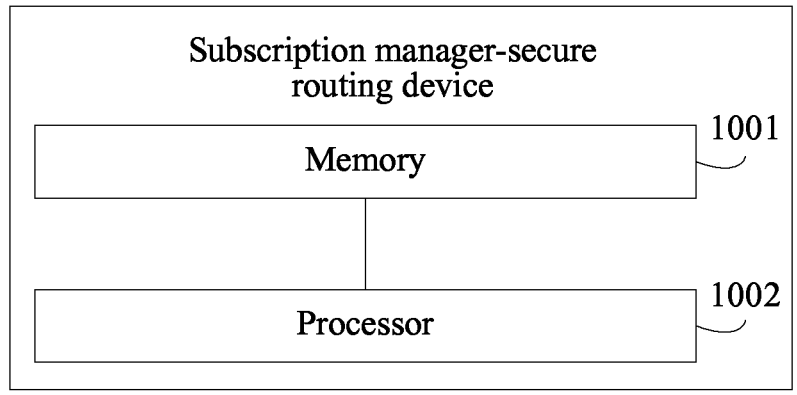
FIG. 10 is a structural diagram of a subscription manager-secure routing device according to another embodiment of the present invention.

According to another aspect of the present invention, the present invention further provides a subscription manager-secure routing device. As shown in FIG. 10, the subscription manager-secure routing device in this embodiment includes: a memory 1001 and a processor 1002.

The processor 1002 is configured to acquire, from a source SM-SR, a profile installer credential corresponding to an eUICC, transmit the profile installer credential to a target SM-DP, and send a PP generation request, where the PP generation request is used for instructing the target SM-DP to generate a target PP corresponding to the subscription manager-secure routing device target SM-SR, and encrypt the target PP by using the profile installer credential.

The processor 1002 is further configured to: after receiving the target PP, generate a key pair including a first key and a second key, and store the key pair in the memory 1001.

The processor 1002 is further configured to send a third request message to the source SM-SR, where the third request message includes: the encrypted target PP and the first key, and the third request message is used for instructing the source SM-SR to send the encrypted target PP and the first key to the eUICC, so that the eUICC replaces an internally preset source SM-SR according to an SM-SR replacement message sent by the source SM-SR.

The processor 1002 is further configured to receive an access request message sent by the eUICC, where the access request message is sent by the eUICC after the eUICC receives the encrypted target PP and the first key, deactivates or deletes a preset source PP corresponding to the source SM-SR, deletes a first profile management credential corresponding to the source SM-SR, and activates the target PP.

The processor 1002 is further configured to encrypt, by using the second key stored in the memory 1001, a second profile management credential corresponding to the target SM-SR, and send the encrypted second profile management credential to the eUICC, so that the eUICC interacts with the target SM-SR after receiving the second profile management credential, so as to obtain an OP profile used for accessing a mobile network, and access the mobile network according to the OP profile.

In an application scenario, the processor 1002 is further configured to receive a second request message sent by the mobile network, where the second request message includes: information about the source SM-SR, and information that the mobile network provides a service for an eUICC activated by an SP, and further includes an eID of the eUICC and/or an IMEI of a terminal in which the eUICC is located.

The information about the source SM-SR, and the eID and/or the IMEI are information carried in a first request message that is sent by the SP after the SP activates the eUICC and received by the mobile network.

In another application scenario, the processor 1002 is further configured to: after determining that the source SM-SR is a legal SM-SR, send, to the source SM-SR, a first switching request used for replacing an SM-SR pre-connected to the eUICC, where the first switching request includes: authentication information of the target SM-SR, and further includes: the eID and/or the IMEI, so that the source SM-SR determines according to the authentication information of the target SM-SR that the target SM-SR is a legal SM-SR, and determines to replace the SM-SR pre-connected to the eUICC for the eUICC.

In a third application scenario, the processor 1002 is further configured to receive a second switching request sent by the source SM-SR and used for replacing an SM-SR pre-connected to the eUICC, where the second switching request includes: authentication information of the source SM-SR, and further includes: the eID and/or the IMEI;

if it is determined according to the authentication information of the source SM-SR that the source SM-SR is a legal SM-SR, send a query message to the target SM-DP, where the query message is used for instructing the target SM-DP to query the mobile network about whether the mobile network can provide a service for an eUICC corresponding to the eID or the IMEI, and the query message includes: the eID and/or the IMEI;

when the mobile network determines that the mobile network can provide the service for the eUICC, receive a query result returned by the target SM-DP, where the query result includes: information that the mobile network can provide the service for the eUICC; and after receiving the query result, send a response to the second switching request to the target SM-SR, where the response includes: authentication information of the target SM-SR, and further includes the eID and/or the IMEI, so that the source SM-SR determines according to the authentication information of the target SM-SR that the target SM-SR is a legal SM-SR, and determines to replace the SM-SR pre-connected to the eUICC for the eUICC.

In a fourth application scenario, the processor 1002 is further configured to receive a third switching request that is sent by the SP after the SP activates the eUICC and used for replacing an SM-SR pre-connected to the eUICC, where the third switching request includes: information about the source SM-SR, and further includes: the eID and/or the IMEI;

after determining that the source SM-SR is a legal SM-SR, send a query message to the target SM-DP, where the query message is used for instructing the target SM-DP to query the mobile network about whether the mobile network can provide a service for an eUICC corresponding to the eID or the IMEI, and the query message includes: the eID and/or the IMEI;

when the mobile network determines that the mobile network can provide the service for the eUICC, receive a query result returned by the target SM-DP, where the query result includes: information that the mobile network can provide the service for the eUICC; and after receiving the query result, send, to the source SM-SR, a first switching request used for replacing the SM-SR pre-connected to the eUICC, where the first switching request includes: authentication information of the target SM-SR, and further includes: the eID and/or the IMEI, so that the source SM-SR determines according to the authentication information of the target SM-SR that the target SM-SR is a legal SM-SR, and determines to replace the SM-SR pre-connected to the eUICC for the eUICC.

According to the subscription manager-secure routing device, it can be ensured that a source SM-SR cannot learn a profile management credential of the subscription manager-secure routing device during an SM-SR process of an eUICC, and in addition, mutual authentication between devices can be implemented, thereby ensuring that the interacting devices are only legal devices.

Figure 11:
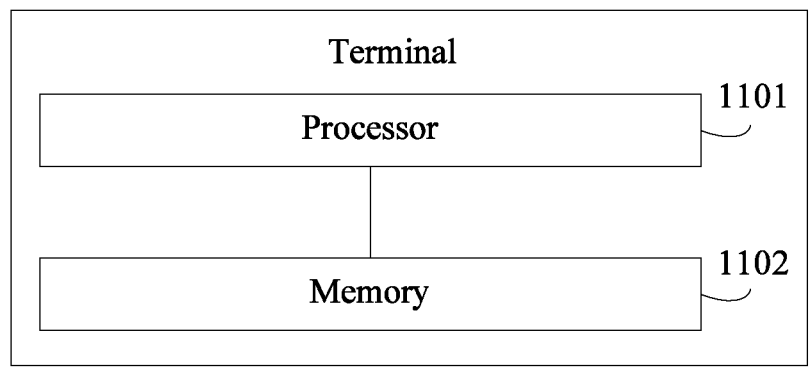
FIG. 11 is a structural diagram of a terminal according to another embodiment of the present invention.

According to another aspect of the present invention, the present invention further provides a terminal. As shown in FIG. 11, the terminal in this embodiment includes: a processor 1101 and a memory 1102. The processor 1101 is configured to receive an SM-SR replacement message sent by a source SM-SR, where the SM-SR replacement message includes: an encrypted target PP, a first key, and replacement indication information, where the first key is a key in a key pair generated by a target SM-SR; and the encrypted target PP is a target PP that is acquired by the target SM-SR from a target SM-DP, encrypted by the target SM-DP by using a profile installer credential, and used for accessing the target SM-SR;

decrypt the encrypted target PP by using an internally preset credential, deactivate or delete a preset source PP corresponding to the source SM-SR, delete a first profile management credential corresponding to the target SM-SR, and activate the target PP, and send an access request message to the target SM-SR, where the access request message is used for enabling the target SM-SR to send a second profile management credential corresponding to the target SM-SR;

receive the second profile management credential that is encrypted by the target SM-SR by using a second key in the key pair, and decrypt the encrypted second profile management credential by using the first key, and interact with the target SM-SR, so as to obtain an OP profile used for accessing a mobile network; and access the mobile network according to the OP profile.

The memory 1102 is configured to store the second profile management credential, the target PP, and the OP profile.

In an application scenario, the processor 1101 is specifically configured to:

send an OP request to the target SM-SR, where the OP request is used for enabling the target SM-SR to acquire the OP profile used for accessing the mobile network; and receive the OP profile sent by the target SM-SR and used for accessing the mobile network, where the OP profile is a profile obtained by the target SM-SR from the mobile network through the target SM-DP.

In another application scenario, the processor 1101 is further configured to:

after an internally preset target PP is activated and information about the mobile network is obtained, send an SM-SR change request to the source SM-SR, where the SM-SR change request includes: the information about the mobile network, and further includes: an eID of the eUICC and/or an IMEI of a terminal in which the eUICC is located, so that the source SM-SR interacts with the target SM-SR, so as to implement access of the eUICC to the target SM-SR, and implement access of the eUICC to the mobile network.

The terminal can implement switching of an SM-SR, and further ensure switching security.

Figure 12:
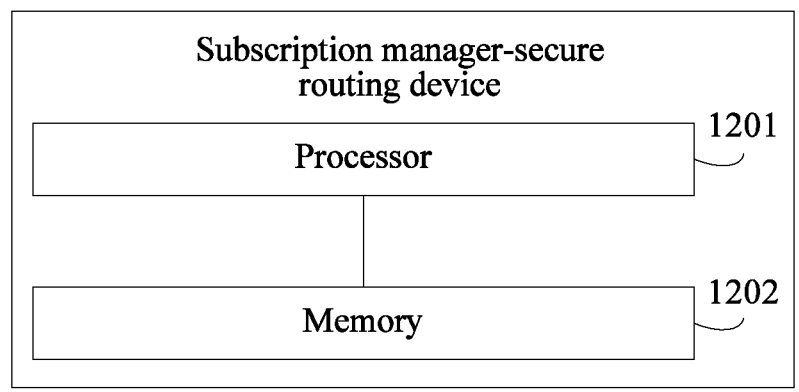
FIG. 12 is a structural diagram of a subscription manager-secure routing device according to another embodiment of the present invention.

According to another aspect of the present invention, the present invention further provides a subscription manager-secure routing device. As shown in FIG. 12, the subscription manager-secure routing device in this embodiment includes: a processor 1201 and a memory 1202.

The processor 1201 is configured to:

after receiving trigger information used for replacing an SM-SR pre-connected to an eUICC, send, to a target SM-SR, a profile installer credential stored in the memory 1202 and used for encrypting a profile, where the trigger information includes information about the target SM-SR;

receive an encrypted target PP and a first key in a key pair that are sent by the target SM-SR, where the encrypted target PP is a target PP that is acquired by the target SM-SR from a target SM-DP, encrypted by the target SM-DP by using the profile installer credential, and used for accessing the target SM-SR, and the key pair is keys generated by the target SM-SR and used for ensuring interaction security between the eUICC and the target SM-SR; and send an SM-SR replacement message to the eUICC, where the SM-SR replacement message includes: the encrypted target PP, the first key in the key pair, and replacement indication information, so that the eUICC accesses the target SM-SR according to the SM-SR replacement message.

Further, the processor 1201 is further configured to:

determine, by the first SM-SR, that the second SM-SR is a legal SM-SR.

Optionally, the processor 1201 is further configured to:

send a profile installer credential acquiring request to a source SM-DP, receive a profile installer credential sent by the source SM-DP and corresponding to the eUICC, and store the profile installer credential in the memory, where the profile installer credential acquiring request includes an eID of the eUICC and/or an IMEI of a terminal in which the eUICC is located.

According to the subscription manager-secure routing device, it can be ensured that a profile management credential of a target SM-SR cannot be learned during an SM-SR process of the eUICC, and in addition, mutual authentication between devices can be implemented, thereby ensuring that the interacting devices are only legal devices.

Figure 13:
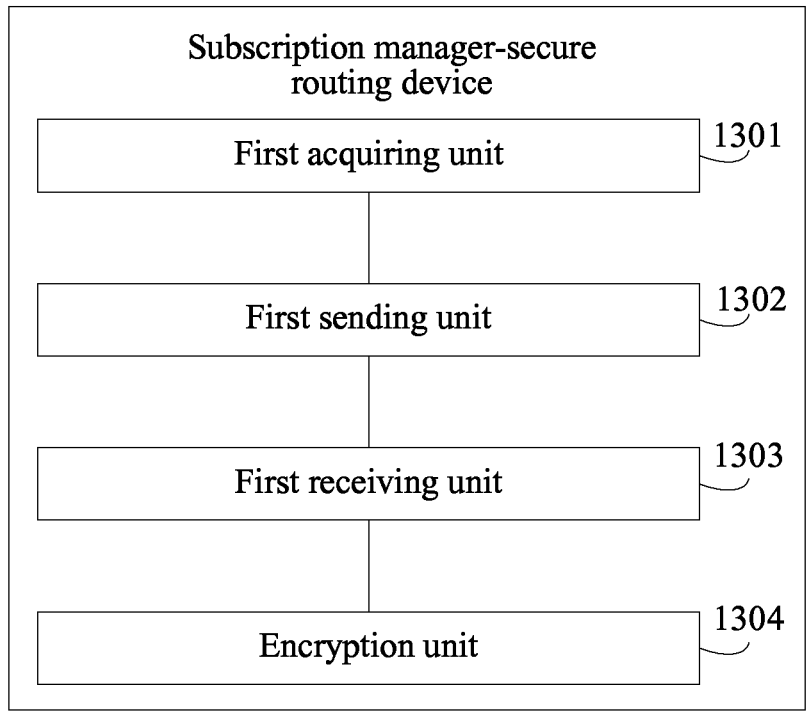
FIG. 13 is a structural diagram of a subscription manager-secure routing device according to another embodiment of the present invention.

According to another aspect of the present invention, the present invention further provides a subscription manager-secure routing device. As shown in FIG. 13, the subscription manager-secure routing device in this embodiment includes: a first acquiring unit 1301, a first sending unit 1302, a first receiving unit 1303, and an encryption unit 1304.

The first acquiring unit 1301 is configured to acquire, from a source subscription manager-secure routing device SM-SR, a profile installer credential corresponding to an embedded universal integrated circuit card eUICC.

The first sending unit 1302 is configured to transmit the profile installer credential to a target SM-DP, and send a provisioning profile PP generation request, where the PP generation request is used for instructing the target SM-DP to generate a target PP corresponding to the subscription manager-secure routing device target SM-SR, and encrypt the target PP by using the profile installer credential.

The first receiving unit 1303 is configured to: after receiving the target PP, generate a key pair including a first key and a second key.

The first sending unit 1302 is further configured to send a third request message to the source SM-SR, where the third request message includes: the encrypted target PP and the first key, and the third request message is used for instructing the source SM-SR to send the encrypted target PP and the first key to the eUICC, so that the eUICC replaces an internally preset source SM-SR according to an SM-SR replacement message sent by the source SM-SR.

The first receiving unit 1303 is further configured to receive an access request message sent by the eUICC, where the access request message is sent by the eUICC after the eUICC receives the encrypted target PP and the first key, deactivates or deletes a preset source PP corresponding to the source SM-SR, deletes a first profile management credential corresponding to the source SM-SR, and activates the target PP.

The encryption unit 1304 is configured to encrypt, by using the second key, a second profile management credential corresponding to the target SM-SR.

The first sending unit is further configured to send an encrypted second profile management credential to the eUICC, so that the eUICC interacts with the target SM-SR after receiving the second profile management credential, so as to obtain an operational profile OP profile used for accessing a mobile network, and access the mobile network according to the OP profile.

Optionally, the first receiving unit 1303 is further configured to receive a second request message sent by the mobile network, where the second request message includes: information about the source SM-SR, and information that the mobile network provides a service for an eUICC activated by an SP, and further includes an eID of the eUICC and/or an IMEI of a terminal in which the eUICC is located.

The information about the source SM-SR, and the eID and/or the IMEI are information carried in a first request message that is sent by the service provider SP after the SP activates the eUICC and received by the mobile network.

In another application scenario, the subscription manager-secure routing device further includes a determining unit 1305 that is not shown in the figure.

The determining unit 1305 is configured to determine that the source SM-SR is a legal SM-SR.

After the determining unit 1305 determines that the source SM-SR is a legal SM-SR, the first sending unit 1302 is further configured to send, to the source SM-SR, a first switching request used for replacing an SM-SR pre-connected to the eUICC, where the first switching request includes: authentication information of the target SM-SR, and further includes: the eID and/or the IMEI, so that the source SM-SR determines according to the authentication information of the target SM-SR that the target SM-SR is a legal SM-SR, and determines to replace the SM-SR pre-connected to the eUICC for the eUICC;

or, after the determining unit 1305 determines that the source SM-SR is a legal SM-SR, the first sending unit 1302 is further configured to send, to the source SM-SR, a first switching request used for replacing an SM-SR pre-connected to the eUICC, where the first switching request includes: the eID and/or the IMEI, so that the source SM-SR determines to replace the SM-SR pre-connected to the eUICC for the eUICC.

Optionally, the first receiving unit 1303 is further configured to receive a second switching request sent by the source SM-SR and used for replacing an SM-SR pre-connected to the eUICC, where the second switching request includes: authentication information of the source SM-SR, and further includes: the eID and/or the IMEI.

In a third optional application scenario, the determining unit 1305 of the subscription manager-secure routing device is further configured to determine according to the authentication information of the source SM-SR that the source SM-SR is a legal SM-SR.

Correspondingly, after the determining unit 1305 determines that the source SM-SR is a legal SM-SR, the first sending unit 1302 is further configured to send a query message to the target SM-DP, where the query message is used for instructing the target SM-DP to query the mobile network about whether the mobile network can provide a service for an eUICC corresponding to the eID or the IMEI, and the query message includes: the eID and/or the IMEI.

The first receiving unit 1303 is further configured to: when the mobile network determines that the mobile network can provide the service for the eUICC, receive a query result returned by the target SM-DP, where the query result includes: information that the mobile network can provide the service for the eUICC; and after the first receiving unit 1303 receives the query result, the first sending unit 1302 is further configured to send a response to the second switching request to the target SM-SR, where the response includes: authentication information of the target SM-SR, and further includes the eID and/or the IMEI, so that the source SM-SR determines according to the authentication information of the target SM-SR that the target SM-SR is a legal SM-SR, and determines to replace the SM-SR pre-connected to the eUICC for the eUICC.

Optionally, the first receiving unit 1303 is further configured to:

receive a third switching request that is sent by an SP after the SP activates the eUICC and used for replacing an SM-SR pre-connected to the eUICC, where the third switching request includes: information about the source SM-SR, and further includes: the eID and/or the IMEI.

In a fourth optional application scenario, the determining unit 1305 included in the subscription manager-secure routing device is further configured to determine that the source SM-SR is a legal SM-SR.

Correspondingly, after the determining unit 1305 determines that the source SM-SR is a legal SM-SR, the first sending unit 1302 is further configured to send a query message to the target SM-DP, where the query message is used for instructing the target SM-DP to query the mobile network about whether the mobile network can provide a service for an eUICC corresponding to the eID or the IMEI, and the query message includes: the eID and/or the IMEI.

The first receiving unit 1303 is further configured to: when the mobile network determines that the mobile network can provide the service for the eUICC, receive a query result returned by the target SM-DP, where the query result includes: information that the mobile network can provide the service for the eUICC; and after the first receiving unit 1303 receives the query result, the first sending unit 1302 is further configured to send, to the source SM-SR, a first switching request used for replacing an SM-SR pre-connected to the eUICC, where the first switching request includes: authentication information of the target SM-SR, and further includes: the eID and/or the IMEI, so that the source SM-SR determines according to the authentication information of the target SM-SR that the target SM-SR is a legal SM-SR, and determines to replace the SM-SR pre-connected to the eUICC for the eUICC.

Figure 14:
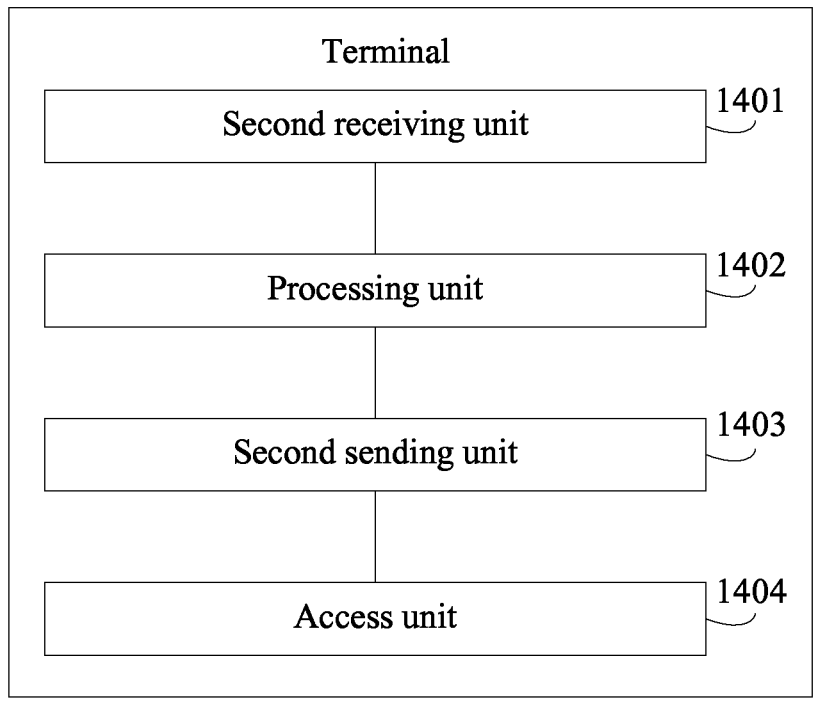
FIG. 14 is a structural diagram of a terminal according to another embodiment of the present invention.

According to another aspect of the present invention, the present invention further provides a terminal. As shown in FIG. 14, the terminal includes: a second receiving unit 1401, a processing unit 1402, a second sending unit 1403, and an access unit 1404.

The second receiving unit 1401 is configured to receive a subscription manager-secure routing device SM-SR replacement message sent by a source SM-SR, where the SM-SR replacement message includes: an encrypted target provisioning profile PP, a first key, and replacement indication information, where the first key is a key in a key pair generated by a target SM-SR; and the encrypted target PP is a target PP that is acquired by the target SM-SR from a target subscription manager-data preparing device SM-DP, encrypted by the target SM-DP by using a profile installer credential, and used for accessing the target SM-SR.

The processing unit 1402 is configured to decrypt the encrypted target PP by using an internally preset credential, deactivate or delete a preset source PP corresponding to the source SM-SR, delete a first profile management credential corresponding to the target SM-SR, and activate the target PP.

The second sending unit 1403 is configured to send an access request message to the target SM-SR, where the access request message is used for enabling the target SM-SR to send a second profile management credential corresponding to the target SM-SR.

The second receiving unit 1401 is further configured to receive the second profile management credential that is encrypted by the target SM-SR by using a second key in the key pair.

The processing unit 1402 is further configured to decrypt the encrypted second profile management credential by using the first key, and interact with the target SM-SR, so as to obtain an operational profile OP profile used for accessing a mobile network.

The access unit 1404 is configured to access the mobile network according to the OP profile.

Optionally, the second sending unit 1403 is specifically configured to:

send an OP request to the target SM-SR, where the OP request is used for enabling the target SM-SR to acquire the OP profile used for accessing the mobile network.

The second receiving unit 1401 is further configured to:

receive the OP profile sent by the target SM-SR and used for accessing the mobile network, where the OP profile is a profile obtained by the target SM-SR from the mobile network through the target SM-DP.

In an optional application scenario, the second sending unit 1403 is further configured to:

after an internally preset target PP is activated and information about the mobile network is obtained, send an SM-SR change request to the source SM-SR, where the SM-SR change request includes: the information about the mobile network, and further includes: an eID of the eUICC and/or an IMEI of a terminal in which the eUICC is located, so that the source SM-SR interacts with the target SM-SR, so as to implement access of the eUICC to the target SM-SR, and implement access of the eUICC to the mobile network.

Figure 15:
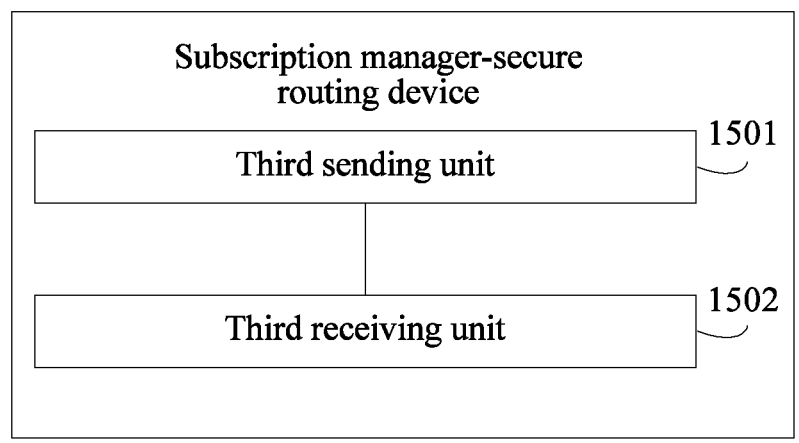
FIG. 15 is a structural diagram of a subscription manager-secure routing device according to another embodiment of the present invention.

According to another aspect of the present invention, the present invention further provides a subscription manager-secure routing device. As shown in FIG. 15, the subscription manager-secure routing device in this embodiment includes: a third sending unit 1501 and a third receiving unit 1502.

The third sending unit 1501 is configured to: after receiving trigger information from a subscription manager-secure routing device of an embedded universal integrated circuit card and used for replacing an SM-SR pre-connected to an eUICC, send, to a target SM-SR, a profile installer credential that is stored in the memory and used for encrypting a profile, where the trigger information includes information about the target SM-SR.

The third receiving unit 1502 is configured to receive an encrypted target PP and a first key in a key pair that are sent by the target SM-SR, where the encrypted target provisioning profile PP is a target PP that is acquired by the target SM-SR from a target subscription manager-data preparing device SM-DP, encrypted by the target SM-DP by using the profile installer credential, and used for accessing the target SM-SR, and the key pair is keys generated by the target SM-SR and used for ensuring interaction security between the eUICC and the target SM-SR.

The third sending unit 1501 is further configured to send an SM-SR replacement message to the eUICC, where the SM-SR replacement message includes: the encrypted target PP, the first key in the key pair, and replacement indication information, so that the eUICC accesses the target SM-SR according to the SM-SR replacement message.

Further, the subscription manager-secure routing device further includes a determining unit 1503 that is not shown in the figure, where the determining unit 1503 is configured to determine that the second SM-SR is a legal SM-SR.

Optionally, the third sending unit 1501 is further configured to send a profile installer credential acquiring request to a source SM-DP, where the profile installer credential acquiring request includes an eID of the eUICC and/or an IMEI of a terminal in which the eUICC is located.

Correspondingly, the third receiving unit 1502 is further configured to receive a profile installer credential sent by the source SM-DP and corresponding to the eUICC.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A method for switching a subscription manager-secure routing device, comprising:
   acquiring, by a second subscription manager-secure routing device (SM-SR) from a first SM-SR, a profile installer credential corresponding to an embedded universal integrated circuit card (eUICC);
   transmitting, by the second SM-SR, the profile installer credential to a second subscription manager-data preparing device (SM-DP), and sending a provisioning profile (PP) generation request, wherein the PP generation request is used for instructing the second SM-DP to generate a second PP corresponding to the second SM-SR and for instructing the second SM-DP to encrypt the second PP by using the profile installer credential;
   generating, by the second SM-SR and after receiving an encrypted second PP sent by the second SM-DP, a key pair comprising a first key and a second key;
   sending, by the second SM-SR, a third request message to the first SM-SR, wherein the third request message comprises the encrypted second PP and the first key, and wherein the third request message is used for instructing the first SM-SR to send the encrypted second PP and the first key to the eUICC, so that the eUICC replaces an internally preset first SM-SR according to an SM-SR replacement message sent by the first SM-SR;
   receiving, by the second SM-SR, an access request message sent by the eUICC, wherein the access request message is sent by the eUICC after the eUICC receives the encrypted second PP and the first key, deactivates or deletes a preset first PP corresponding to the first SM-SR, deletes a first profile management credential corresponding to the first SM-SR, and activates the second PP; and
   encrypting, by the second SM-SR by using the second key, a second profile management credential corresponding to the second SM-SR, and sending an encrypted second profile management credential to the eUICC, so that the eUICC interacts with the second SM-SR after receiving the encrypted second profile management credential, so as to obtain an operational profile (OP profile) used for accessing a mobile network, and access the mobile network according to the OP profile.

2. The method according to claim 1, further comprising:
   receiving, by the second SM-SR and before the acquiring the profile installer credential corresponding to the eUICC, a second request message sent by the mobile network, wherein the second request message comprises information about the first SM-SR, and information that the mobile network provides a service for the eUICC activated by a service provider (SP), and wherein the second request message further comprises at least one of an identity (eID) of the eUICC or an international mobile equipment identity (IMEI) of a terminal in which the eUICC is located;
   wherein the information about the first SM-SR, the eID, and the IMEI are information carried in a first request message that is sent by the SP after the SP activates the eUICC and received by the mobile network; and
   wherein the acquiring, by the second SM-SR from the first SM-SR, the profile installer credential corresponding to the eUICC comprises acquiring, by the second SM-SR from the first SM-SR, the profile installer credential corresponding to the eUICC, according to the information about the first SM-SR.

3. The method according to claim 2, further comprising:
   sending, by the second SM-SR to the first SM-SR, after the second SM-SR determines that the first SM-SR is a legal SM-SR and before the acquiring the profile installer credential corresponding to an eUICC, a first switching request used for replacing an SM-SR preconnected to the eUICC; and
   wherein the first switching request comprises at least one of the eID or the IMEI so that the first SM-SR determines to replace the SM-SR pre-connected to the eUICC with the second SM-SR for the eUICC, or the first switching request comprises authentication information of the second SM-SR and one or more of the eID and the IMEI, so that the first SM-SR determines according to the authentication information of the second SM-SR that the second SM-SR is a legal SM-SR, and determines to replace the SM-SR pre-connected to the eUICC with the second SM-SR for the eUICC.

4. The method according to claim 3, further comprising:
   receiving, by the second SM-SR and before the step of acquiring a profile installer credential corresponding to an eUICC, a switching response that is sent by the first SM-SR according to the first switching request; and
   wherein the switching response comprises the profile installer credential.

5. The method according to claim 4, wherein the switching response further comprises an eUICC credential used by the second SM-SR to authenticate the eUICC, and an SM-SR credential used by the eUICC to authenticate the second SM-SR.

6. The method according to claim 4, further comprising:
   determining, by the second SM-SR according to an eUICC credential and before the receiving the access request message sent by the eUICC, that the eUICC is a legal device.

7. The method according to claim 4, wherein the encrypting the second profile management credential corresponding to the second SM-SR comprises encrypting, by the second SM-SR and by using the second key, the second profile management credential corresponding to the second SM-SR; and
   wherein the sending the encrypted second profile management credential to the eUICC comprises sending the encrypted second profile management credential and an SM-SR credential to the eUICC, so that the eUICC interacts with the second SM-SR after determining according to the SM-SR credential that the second SM-SR is a legal SM-SR, so as to obtain an OP profile for accessing the mobile network, and access the mobile network according to the OP profile.

8. The method according to claim 2, wherein the acquiring the profile installer credential corresponding to the eUICC comprises:

sending, by the second SM-SR, a first switching request to the first SM-SR, wherein the first switching request comprises information about the second SM-SR; and receiving a switching response that is sent by the first SM-SR according to the first switching request, wherein the switching response comprises the profile installer credential.

9. The method according to claim 2, wherein the acquiring the profile installer credential corresponding to the eUICC comprises:

sending, by the second SM-SR, a first switching request to the first SM-SR, wherein the first switching request comprises information about the second SM-SR; and receiving a switching response that is sent by the first SM-SR according to the first switching request, wherein the switching response comprises the profile installer credential, an eUICC credential used by the second SM-SR to authenticate the eUICC, and an SM-SR credential used by the eUICC to authenticate the second SM-SR.

10. The method according to claim 1, wherein the encrypting the second profile management credential corresponding to the second SM-SR comprises:

encrypting, by the second SM-SR, the second profile management credential by using the second key, and sending the encrypted second profile management credential to the eUICC;

receiving, by the second SM-SR, an OP request that is sent by the eUICC after the eUICC receives the second profile management credential, wherein the OP request is used for enabling the second SM-SR to acquire the OP profile used for accessing the mobile network;

sending, by the second SM-SR, an OP profile acquiring request to the second SM-DP according to the OP request, wherein the OP profile acquiring request is used for enabling the second SM-DP to interact with the mobile network, so as to obtain the OP profile; and receiving, by the second SM-SR, the OP profile that is sent by the second SM-DP and encrypted by using the profile installer credential, wherein the sending the encrypted second profile management credential to the eUICC comprises sending, by the second SM-SR, an encrypted OP profile to the eUICC, so that the eUICC accesses the mobile network according to the OP profile.

11. The method according to claim 1, further comprising:

receiving, by the second SM-SR and before the step of acquiring the profile installer credential corresponding to the eUICC, a second switching request sent by the first SM-SR and used for replacing an SM-SR pre-connected to the eUICC, wherein the second switching request comprises authentication information of the first SM-SR, wherein the second switching request further comprises at least one of an identity (eID) of the eUICC or an international mobile equipment identity (IMEI) of a terminal in which the eUICC is located;

sending, by the second SM-SR and in response to the second SM-SR determining that the first SM-SR is a legal SM-SR according to the authentication information of the first SM-SR, a query message to the second SM-DP, wherein the query message is used for instructing the second SM-DP to query the mobile network about whether the mobile network can provide a service for an eUICC corresponding to the eID or the IMEI, and the query message comprises the eID, the IMEI or the eID and the IMEI;

receiving, by the second SM-SR and in response to the mobile network determining that the mobile network can provide the service for the eUICC, a query result returned by the second SM-DP, wherein the query result comprises information that the mobile network can provide the service for the eUICC; and sending, by the second SM-SR and after receiving the query result, a response to the second switching request to the first SM-SR, wherein the response comprises authentication information of the second SM-SR, and wherein the response further comprises the eID, the IMEI or both the eID and IMEI, so that the first SM-SR determines that the second SM-SR is a legal SM-SR according to the authentication information of the second SM-SR, and determines to replace the SM-SR pre-connected to the eUICC with the second SM-SR for the eUICC.

12. The method according to claim 1, further comprising:

receiving, by the second SM-SR and before the step of acquiring a profile installer credential corresponding to an eUICC, a third switching request that is sent by an SP after the SP activates the eUICC and used for replacing an SM-SR pre-connected to the eUICC, wherein the third switching request comprises information about the first SM-SR, and wherein the third switching request further comprises an eID, an IMEI or the eID and the IMEI;

sending, by the second SM-SR and after determining that the first SM-SR is a legal SM-SR, a query message to the second SM-DP, wherein the query message is used for instructing the second SM-DP to query the mobile network about whether the mobile network can provide a service for an eUICC corresponding to the eID or the IMEI, and the query message comprises the eID, IMEI or both the eID and the IMEI;

receiving, by the second SM-SR and in response to the mobile network determining that the mobile network can provide the service for the eUICC, a query result returned by the second SM-DP, wherein the query result comprises information that the mobile network can provide the service for the eUICC; and sending, by the second SM-SR to the first SM-SR and after receiving the query result, a first switching request used for replacing the SM-SR pre-connected to the eUICC, wherein the first switching request comprises authentication information of the second SM-SR, and wherein the first switching request further comprises the eID, the IMEI or both the eID and the IMEI, so that the first SM-SR determines according to the authentication information of the second SM-SR that the second SM-SR is a legal SM-SR, and determines to replace the SM-SR pre-connected to the eUICC with the second SM-SR for the eUICC.

13. The method according to claim 1, further comprising:

receiving, by the second SM-SR, a third switching request that is sent by an SP after the SP activates the eUICC and used for replacing an SM-SR pre-connected to the eUICC, wherein the third switching request comprises information about the first SM-SR, and wherein the third switching request further comprises at least one of an identity (eID) of the eUICC or an international mobile equipment identity (IMEI) of a terminal in which the eUICC is located;

sending, by the second SM-SR and after determining that the first SM-SR is a legal SM-SR, a query message to the second SM-DP, wherein the query message is used for instructing the second SM-DP to query the mobile network about whether the mobile network can provide a service for an eUICC corresponding to the eID or the IMEI, and the query message comprises the eID, the IMEI, or both the eID and the IMEI;

receiving, by the second SM-SR and when the mobile network determines that the mobile network can provide the service for the eUICC, a query result returned by the second SM-DP, wherein the query result comprises information that the mobile network can provide the service for the eUICC; and after receiving the query result, sending, by the second SM-SR to the first SM-SR, a first switching request used for replacing the SM-SR pre-connected to the eUICC, wherein the first switching request comprises the eID, the IMEI, or both the eID and the IMEI, so that the first SM-SR determines to replace the SM-SR pre-connected to the eUICC with the second SM-SR for the eUICC.

14. A method for switching a subscription manager-secure routing device, comprising:

receiving, by an embedded universal integrated circuit card (eUICC), a subscription manager-secure routing device (SM-SR) replacement message sent by a first SM-SR, wherein the SM-SR replacement message comprises an encrypted second provisioning profile (PP), a first key, and replacement indication information, wherein the first key is a key in a key pair generated by a second SM-SR, wherein the encrypted second PP is a second provisioning profile that is acquired by the second SM-SR from a second subscription manager-data preparing device (SM-DP), wherein the encrypted second PP is encrypted by the second SM-DP by using a profile installer credential, and wherein the encrypted second PP is used for accessing the second SM-SR;

decrypting, by the eUICC, the encrypted second PP by using an internally preset credential;

performing one of deactivating or deleting a preset first PP corresponding to the first SM-SR;

deleting a first profile management credential corresponding to the first SM-SR; and activating the second PP;

sending an access request message to the second SM-SR, wherein the access request message is used for enabling the second SM-SR to send a second profile management credential corresponding to the second SM-SR;

receiving, by the eUICC, the second profile management credential that is encrypted by the second SM-SR by using a second key in the key pair;

decrypting an encrypted second profile management credential by using the first key;

interacting with the second SM-SR, so as to obtain an operational profile (OP profile) used for accessing a mobile network; and accessing, by the eUICC, the mobile network according to the OP profile.

15. The method according to claim 14, wherein the receiving, by the eUICC, the second profile management credential that is encrypted by the second SM-SR by using a second key in the key pair comprises receiving, by the eUICC, the second profile management credential that is encrypted by the second SM-SR by using the second key in the key pair, and receiving an SM-SR credential sent by the second SM-SR and used by the eUICC to authenticate the second SM-SR; and wherein the decrypting the encrypted second profile management credential by using the first key, and interacting with the second SM-SR comprises decrypting, by the eUICC and after determining according to the SM-SR credential that the second SM-SR is a legal SM-SR, the encrypted second profile management credential by using the first key, and interacting with the second SM-SR.

16. The method according to claim 14, wherein the interacting with the second SM-SR comprises:

sending, by the eUICC, an OP request to the second SM-SR, wherein the OP request is used for enabling the second SM-SR to acquire the OP profile used for accessing the mobile network; and receiving, by the eUICC, the OP profile sent by the second SM-SR and used for accessing the mobile network, wherein the OP profile is a profile obtained by the second SM-SR from the mobile network through the second SM-DP.

17. The method according to claim 14, further comprising:

sending an SM-SR change request to the first SM-SR, therein the sending is by the eUICC, after an internally preset first PP is activated, after information about the mobile network is obtained, and before the receiving the SM-SR replacement message sent by a first SM-SR, wherein the SM-SR change request comprises the information about the mobile network, and wherein the SM-SR change request further comprises an identity (eID) of the eUICC and/or an international mobile equipment identity (IMEI) of a terminal in which the eUICC is located, so that the first SM-SR interacts with the second SM-SR, so as to implement access of the eUICC to the second SM-SR, and implement access of the eUICC to the mobile network.

18. A method for switching a subscription manager-secure routing device, comprising:

sending a profile installer credential used for encrypting a profile, wherein the profile installer credential is sent by a first subscription manager-secure routing device (SM-SR) to a second SM-SR and after receiving trigger information from an embedded universal integrated circuit card (eUICC) and that is used for replacing an SM-SR pre-connected to the eUICC, wherein the trigger information comprises information about the second SM-SR;

receiving, by the first SM-SR, an encrypted second provisioning profile (PP) and a first key in a key pair that are sent by the second SM-SR, wherein the encrypted second PP is a second PP that is acquired by the second SM-SR from a second subscription manager-data preparing device (SM-DP), wherein the encrypted second PP has been encrypted by the second SM-DP by using the profile installer credential, wherein the second PP is used for accessing the second SM-SR, and wherein the key pair comprises keys generated by the second SM-SR and is used for ensuring interaction security between the eUICC and the second SM-SR; and sending, by the first SM-SR, an SM-SR replacement message to the eUICC, wherein the SM-SR replacement message comprises the encrypted second PP, the first key in the key pair, and replacement indication information, so that the eUICC accesses the second SM-SR according to the SM-SR replacement message.

19. The method according to claim 18, further comprising:

receiving, by the first SM-SR and before the sending the profile installer credential used for encrypting the profile, the trigger information used for replacing the SM-SR pre-connected to the eUICC, wherein the trigger information is one of a first switching request that is sent by the second SM-SR to the first SM-SR according to information about the first SM-SR or a second switching request sent by the eUICC to the first SM-SR according to obtained information about a mobile network.

20. The method according to claim 18, further comprising:
   determining, by the first SM-SR and before the sending the profile installer credential used for encrypting the profile, that the second SM-SR is a legal SM-SR.

21. The method according to claim 18, further comprising:
   sending, by the first SM-SR and before the sending the profile installer credential used for encrypting the profile, a profile installer credential acquiring request to a first SM-DP; and
   receiving a profile installer credential sent by the first SM-DP and corresponding to the eUICC, wherein the profile installer credential acquiring request comprises at least one of an identity (eID) of the eUICC or an international mobile equipment identity (IMEI) of a terminal in which the eUICC is located.

22. A method for switching a subscription manager-secure routing device (SM-SR), comprising:
   receiving, by a mobile network corresponding to a second SM-SR, a first request message that is sent by a service provider (SP) after the SP activates an embedded universal integrated circuit card (eUICC), wherein the first request message comprises information about a first SM-SR, and at least one of an identity (eID) of the eUICC or an international mobile equipment identity (IMEI) of a terminal in which the eUICC is located;
   sending, by the mobile network, a second request message to the second SM-SR, wherein the second request message comprises the information about the first SM-SR, and information that the mobile network provides a service for the eUICC activated by the SP, and wherein the second request message further comprises at least one of the eID of the eUICC or the IMEI of the terminal in which the eUICC is located, so that the eUICC switches an internally preset first SM-SR to the second SM-SR using an encrypted second provisioning profile (PP) corresponding to the second SM-SR, and accesses the mobile network through the second SM-SR;
   receiving, by the mobile network, a profile generation request sent by a second subscription manager-data preparing device (SM-DP) and used for enabling the eUICC to connect to the mobile network, wherein the profile generation request comprises at least one of an integrated circuit card identity (ICCID) or the IMEI, wherein the ICCID is an ICCID that is converted from the eID by the second SM-DP and can be identified by the mobile network;
   sending, by the mobile network to the second SM-DP, an operational profile (OP profile) that is required by the eUICC to connect to the mobile network; and
   receiving, by the mobile network, a network access request that is sent by the eUICC according to the OP profile, and enabling the eUICC to access the mobile network according to the network access request.

23. A subscription manager-secure routing device, comprising:
   a processor; and
   a non-transitory computer readable medium connected to the processor and having stored thereon instructions for causing the processor to:
      acquire, from a source subscription manager-secure routing device (SM-SR), a profile installer credential corresponding to an embedded universal integrated circuit card (eUICC), wherein the subscription manager-secure routing device is a target SM-SR;
      transmit the profile installer credential to a target subscription manager-data preparing device (SM-DP);
      send a provisioning profile (PP) generation request to the target SM-DP, wherein the PP generation request is used for instructing the target SM-DP to generate a target PP corresponding to the target SM-SR and for instructing the target SM-DP to encrypt the target PP by using the profile installer credential;
      generate a key pair comprising a first key and a second key after receiving the encrypted target PP;
      send a third request message to the source SM-SR, wherein the third request message comprises the encrypted target PP and the first key, and wherein the third request message is used for instructing the source SM-SR to send the encrypted target PP and the first key to the eUICC, so that the eUICC replaces an internally preset source SM-SR according to an SM-SR replacement message sent by the source SM-SR; and
      receive an access request message sent by the eUICC, wherein the access request message is sent by the eUICC after the eUICC receives the encrypted target PP and the first key, deactivates or deletes a preset source PP corresponding to the source SM-SR, deletes a first profile management credential corresponding to the source SM-SR, and activates the target PP;
      encrypt, by using the second key, a second profile management credential corresponding to the target SM-SR; and
      send an encrypted second profile management credential to the eUICC, so that the eUICC interacts with the target SM-SR after receiving the second profile management credential, so as to obtain an operational profile (OP profile) for accessing a mobile network, and access the mobile network according to the OP profile.

24. The device according to claim 23, wherein the non-transitory computer readable medium further has stored thereon instructions for causing the processor to:
   receive a second request message sent by the mobile network, wherein the second request message comprises information about the source SM-SR, and information that the mobile network provides a service for an eUICC activated by a service provider (SP), and wherein the second request message further comprises at least one of an eID of the eUICC or an IMEI of a terminal in which the eUICC is located, wherein the information about the source SM-SR, the eID, and the IMEI are information carried in a first request message that is sent by the SP after the SP activates the eUICC and received by the mobile network.

25. The device according to claim 24, wherein the non-transitory computer readable medium further has stored thereon instructions for causing the processor to:
   determine that the source SM-SR is a legal SM-SR; and
   send, to the source SM-SR and after determining that the source SM-SR is a legal SM-SR, a first switching request used for replacing an SM-SR pre-connected to the eUICC, wherein the first switching request comprises authentication information of the target SM-SR, and wherein the first switching request further comprises the eID, the IMEI, or both the eID and the IMEI, so that the source SM-SR determines that the target SM-SR is a legal SM-SR according to the authentication information of the target SM-SR, and determines to replace the SM-SR pre-connected to the eUICC with the target SM-SR for the eUICC.

26. The device according to claim 24, wherein the non-transitory computer readable medium further has stored thereon instructions for causing the processor to:
   determine that the source SM-SR is a legal SM-SR; and
   send, to the source SM-SR, a first switching request used for replacing an SM-SR pre-connected to the eUICC, wherein the first switching request comprises the eID, the IMEI, or both the eID and the IMEI, so that the source SM-SR determines to replace the SM-SR pre-connected to the eUICC with the target SM-SR for the eUICC.

27. The device according to claim 24, wherein the non-transitory computer readable medium further has stored thereon instructions for causing the processor to:
   receive a second switching request sent by the source SM-SR and used for replacing an SM-SR pre-connected to the eUICC, wherein the second switching request comprises authentication information of the source SM-SR, and further comprises the eID, the IMEI, or both the eID and the IMEI;
   determine that the source SM-SR is a legal SM-SR according to the authentication information of the source SM-SR;
   send a query message to the target SM-DP after determining that the source SM-SR is a legal SM-SR, wherein the query message is used for instructing the target SM-DP to query the mobile network about whether the mobile network can provide a service for an eUICC corresponding to the eID or the IMEI, and wherein the query message comprises at least one of an eID or an IMEI;
   receive a query result returned by the target SM-DP in response to the mobile network determining that the mobile network can provide the service for the eUICC, wherein the query result comprises information that the mobile network can provide the service for the eUICC; and
   send a response to the second switching request to the source SM-SR after the receiving the query result, wherein the response comprises authentication information of the target SM-SR, and wherein the response further comprises the eID, the IMEI, or both the eID and the IMEI, so that the source SM-SR determines according to the authentication information of the target SM-SR that the target SM-SR is a legal SM-SR, and determines to replace the SM-SR pre-connected to the eUICC with the target SM-SR for the eUICC.

28. The device according to claim 24, wherein the non-transitory computer readable medium further has stored thereon instructions for causing the processor to:
   receive a third switching request that is sent by an SP after the SP activates the eUICC and that is used for replacing an SM-SR pre-connected to the eUICC, wherein the third switching request comprises information about the source SM-SR, and wherein the third switching request further comprises the eID, the IMEI, or both the eID and the IMEI;
   determine that the source SM-SR is a legal SM-SR;
   send a query message to the target SM-DP after determining that the source SM-SR is a legal SM-SR, wherein the query message is used for instructing the target SM-DP to query the mobile network about whether the mobile network can provide a service for an eUICC corresponding to the eID or the IMEI, and the query message comprises the eID, the IMEI, or both the eID and the IMEI;
   receive a query result returned by the target SM-DP in response to the mobile network determining that the mobile network can provide the service for the eUICC, wherein the query result comprises information that the mobile network can provide the service for the eUICC; and
   send, to the source SM-SR and after the receiving the query result, a first switching request used for replacing an SM-SR pre-connected to the eUICC, wherein the first switching request comprises authentication information of the target SM-SR, and wherein the first switching request further comprises the eID, the IMEI, or both the eID and the IMEI, so that the source SM-SR determines according to the authentication information of the target SM-SR that the target SM-SR is a legal SM-SR, and determines to replace the SM-SR pre-connected to the eUICC with the target SM-SR for the eUICC.

29. A subscription manager-secure routing device, comprising:
   a processor; and
   a non-transitory computer readable medium connected to the processor and having stored thereon instructions for causing the processor to:
      send, after receiving trigger information from a target subscription manager-secure routing device (SM-SR) of an embedded universal integrated circuit card (eUICC), to the target SM-SR, a profile installer credential that is stored in a memory and used for encrypting a profile, wherein the trigger information comprises information about the target SM-SR; and
      receive an encrypted target provisioning profile (PP) and a first key in a key pair that are sent by the target SM-SR, wherein the encrypted target PP is a target PP that is acquired by the target SM-SR from a target subscription manager-data preparing device (SM-DP), encrypted by the target SM-DP by using the profile installer credential, and used for accessing the target SM-SR, and wherein the key pair comprises keys generated by the target SM-SR and used for ensuring interaction security between the eUICC and the target SM-SR; and
      send an SM-SR replacement message to the eUICC, wherein the SM-SR replacement message comprises the encrypted target PP, the first key in the key pair, and replacement indication information, so that the eUICC accesses the target SM-SR according to the SM-SR replacement message.

30. The device according to claim 29, wherein the non-transitory computer readable medium further has stored thereon instructions for causing the processor to determine that the target SM-SR is a legal SM-SR.

31. The device according to claim 29, wherein the non-transitory computer readable medium further has stored thereon instructions for causing the processor to:
   send a profile installer credential acquiring request to a source SM-DP, wherein the profile installer credential acquiring request comprises at least one of an eID of the eUICC or an IMEI of a terminal in which the eUICC is located; and receive a profile installer credential sent by the source SM-DP and corresponding to the eUICC.

32. A subscription manager-secure routing device, comprising:

a processor; and a non-transitory computer readable medium connected to the processor and having stored thereon instructions for causing the processor to:

receive, from a mobile network, a first request message comprising information about a source subscription manager-secure routing device (SM-SR), information that the mobile network provides a service for an embedded universal integrated circuit card (eUICC) activated by a service provider (SP), and at least one of an identity (eID) of the eUICC or an international mobile equipment identity (IMEI) of a terminal in which the eUICC is located, wherein the subscription manager-secure routing device is a target SM-SR;

generate a temporary key pair comprising a public key and a private key using an encrypted target provisioning profile (PP);

send a second request message to the source SM-SR, wherein the second request message comprises the encrypted target PP and the public key, and wherein the second request message instructs the source SM-SR to send the encrypted target PP and the public key to the eUICC, so that the eUICC replaces an internally preset source SM-SR according to an SM-SR replacement message sent by the source SM-SR; and receive an access request message sent by the eUICC, wherein the access request message is sent by the eUICC after the eUICC receives the encrypted target PP and the public key, deactivates or deletes a preset source PP corresponding to the source SM-SR, deletes a first profile management credential corresponding to the source SM-SR, and activates the encrypted target PP;

encrypt, by using the private key, a second profile management credential corresponding to the target SM-SR; and send an encrypted second profile management credential to the eUICC, so that the eUICC interacts with the target SM-SR after receiving the second profile management credential, so as to obtain an operational profile (OP profile) for accessing a mobile network, and access the mobile network according to the OP profile.

33. The device according to claim 32, wherein the non-transitory computer readable medium further has stored thereon instructions for causing the processor to:

acquire, from the source SM-SR, a profile installer credential corresponding to the eUICC;

transmit the profile installer credential to a target subscription manager-data preparing device (SM-DP);

send a PP generation request to the target SM-DP, wherein the PP generation request instructs the target SM-DP to generate a target PP corresponding to the target SM-SR and to encrypt the target PP by using the profile installer credential; and receive, from the target SM-DP, the encrypted target PP.

34. The device according to claim 33, wherein the non-transitory computer readable medium further has stored thereon instructions for causing the processor to:

determine that the source SM-SR is a legal SM-SR according to authentication information of the source SM-SR; and send, to the source SM-SR and after determining that the source SM-SR is a legal SM-SR, a first switching request used for replacing an SM-SR pre-connected to the eUICC, wherein the first switching request comprises authentication information of the target SM-SR, and at least one of the eID or the IMEI, so that the source SM-SR determines that the target SM-SR is a legal SM-SR according to the authentication information of the target SM-SR, and determines to replace the SM-SR pre-connected to the eUICC with the target SM-SR for the eUICC.

* * * * *